United States Patent
Deng et al.

(10) Patent No.: US 10,803,004 B2
(45) Date of Patent: Oct. 13, 2020

(54) MODULAR UPS SYSTEM AND DATA TRANSMISSION METHOD FOR POWER DEVICE

(71) Applicant: Huawei Technologies Co., Ltd., Shenzhen (CN)

(72) Inventors: Lei Deng, Shenzhen (CN); Xuejuan Kong, Dongguan (CN); Zhou Shu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/445,607

(22) Filed: Jun. 19, 2019

(65) Prior Publication Data

US 2019/0303341 A1  Oct. 3, 2019

Related U.S. Application Data

(63) Continuation of application No. PCT/CN2017/102415, filed on Sep. 20, 2017.

(30) Foreign Application Priority Data

Dec. 21, 2016 (CN) .......................... 2016 1 1189796

(51) Int. Cl.
*G06F 13/42* (2006.01)
*H04L 12/10* (2006.01)
*H04L 12/40* (2006.01)

(52) U.S. Cl.
CPC .......... *G06F 13/4282* (2013.01); *H04L 12/10* (2013.01); *H04L 12/40* (2013.01);
(Continued)

(58) Field of Classification Search
CPC ...... G06F 13/4282; H04L 12/10; H04L 12/40
See application file for complete search history.

(56) References Cited

U.S. PATENT DOCUMENTS 10,193,859 B2 * 1/2019 Maeda ............... H04L 12/40006
2001/0033502 A1 * 10/2001 Blair ....................... H02J 9/062
363/65

(Continued)

FOREIGN PATENT DOCUMENTS

CN    100561826 C    11/2009
CN    101154826 B    6/2010

(Continued)

OTHER PUBLICATIONS

Foreign Communication From A Counterpart Application, European Application No. 17885183.8, Extended European Search Report dated Sep. 27, 2019, 9 pages.

(Continued)

*Primary Examiner* — Henry Tsai
*Assistant Examiner* — Christopher A Daley
(74) *Attorney, Agent, or Firm* — Conley Rose, P.C.

(57) ABSTRACT

A modular UPS system includes at least two power devices, a controlling device, and a serial bus. The power device is configured to receive control status information transmitted by the controlling device. The power device is configured to transmit a status signal data frame to the serial bus according to the control status information when determining that a current period is a first preset period, where the status signal data frame includes an identifier field, the identifier field includes a status signal data area, and the status signal data area is used to store a data value of a status signal. The serial bus is configured to receive status signal data frames transmitted by the at least two power devices, and transmit status signal data frames with a same value in status signal data areas to the controlling device in parallel.

20 Claims, 9 Drawing Sheets

(52) U.S. Cl.
CPC .............. *H04L 12/40013* (2013.01); *H04L 2012/40215* (2013.01)

(56) References Cited

U.S. PATENT DOCUMENTS

| | | | | |
|---|---|---|---|---|
| 2004/0073330 | A1* | 4/2004 | Bader | B43M 3/045 700/220 |
| 2014/0258573 | A1 | 9/2014 | Johnson | |
| 2015/0022002 | A1 | 1/2015 | Agrawal et al. | |
| 2015/0207362 | A1 | 7/2015 | Ohnishi et al. | |
| 2016/0054381 | A1 | 2/2016 | Wakan et al. | |
| 2016/0197546 | A1* | 7/2016 | Jung | H02M 7/53873 363/123 |
| 2017/0302409 | A1* | 10/2017 | Sherlock | H04L 1/1621 |
| 2018/0019467 | A1* | 1/2018 | Zhu | H01J 37/32403 |
| 2019/0208605 | A1* | 7/2019 | Ardai | H05B 47/18 |

FOREIGN PATENT DOCUMENTS

| | | |
|---|---|---|
| CN | 102790418 A | 11/2012 |
| CN | 102957196 A | 3/2013 |
| CN | 102624075 B | 1/2014 |
| CN | 103595117 A | 2/2014 |
| CN | 102480140 B | 4/2014 |
| CN | 104025421 A | 9/2014 |
| CN | 104052631 A | 9/2014 |
| CN | 104508942 A | 4/2015 |
| CN | 102984096 B | 5/2015 |
| CN | 104600764 A | 5/2015 |
| CN | 106936677 A | 7/2017 |
| EP | 1879331 A1 | 1/2008 |
| EP | 2736206 A1 | 5/2014 |
| EP | 2941066 A1 | 11/2015 |
| WO | 2013058759 A1 | 4/2013 |
| WO | 2014161861 A1 | 10/2014 |

OTHER PUBLICATIONS

Machine Translation and Abstract of Chinese Publication No. CN100561826, Nov. 18, 2009, 13 pages.
Machine Translation and Abstract of Chinese Publication No. CN101154826, Jun. 16, 2010, 18 pages.
Machine Translation and Abstract of Chinese Publication No. CN102480140, Apr. 9, 2014, 15 pages.
Machine Translation and Abstract of Chinese Publication No. CN102624075, Jan. 22, 2014, 13 pages.
Machine Translation and Abstract of Chinese Publication No. CN102790418, Nov. 21, 2012, 12 pages.
Machine Translation and Abstract of Chinese Publication No. CN102957196, Mar. 6, 2013, 12 pages.
Machine Translation and Abstract of Chinese Publication No. CN102984096, May 13, 2015, 10 pages.
Machine Translation and Abstract of Chinese Publication No. CN103595117, Feb. 19, 2014, 8 pages.
Machine Translation and Abstract of Chinese Publication No. CN104052631, Sep. 17, 2014, 18 pages.
Machine Translation and Abstract of Chinese Publication No. CN104600764, May 6, 2015, 19 pages.
Machine Translation and Abstract of Chinese Publication No. CN106936677, Jul. 7, 2017, 44 pages.
Dong-Fang, Z., et al., "Detecting method for UPS battery with CAN-bus," vol. 36, No. 8, Aug. 2012, pp. 1140-1142.
Foreign Communication From A Counterpart Application, Chinese Application No. 201611189796.5, Chinese Office Action dated Aug. 1, 2019, 5 pages.
Foreign Communication From A Counterpart Application, PCT Application No. PCT/CN2017/102415, English Translation of International Search Report dated Dec. 7, 2017, 2 pages.
Foreign Communication From A Counterpart Application, PCT Application No. PCT/CN2017/102415, English Translation of Written Opinion dated Dec. 7, 2017, 4 pages.

* cited by examiner

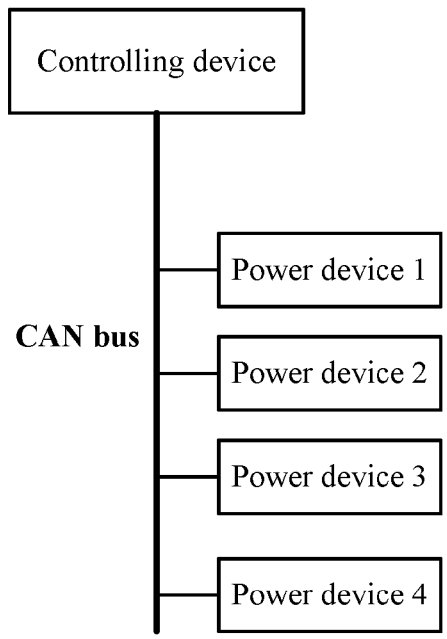
FIG. 1
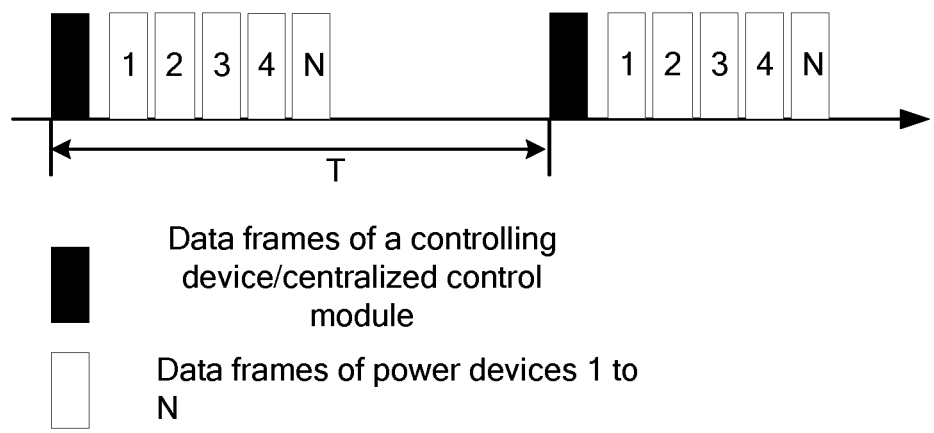
FIG. 2
| ID field | | | Data field | | | |
|---|---|---|---|---|---|---|
| Frame type | Module address | Reserved | Signal 1 | Signal 2 | Signal 3 | Signal n |
FIG. 3

| ID field | | | | | Data field |
|---|---|---|---|---|---|
| Frame type | Signal A | Signal B | Signal C | Reserved bit | Null |
| 6 bits | 1 bit | 1 bit | 1 bit | 20 bits | Null |

| | ID field | | | | |
|---|---|---|---|---|---|
| Bit location | Frame type | Signal A | Signal B | Signal C | Reserved bit |
| Majority of modules | 0x02 | 001B | 10B | 1B | 0xFFFF |
| Minority of modules | 0x02 | 010B | 01B | 1B | 0xFFFF |
| System | -- | 001B | 01B | 1B | -- |

|  | ID field | | | | |
|---|---|---|---|---|---|
| Bit location | Frame type | Signal A | Signal B | Signal C | Reserved bit |
| First-type module | 0x02 | 001B | 10B | 1B | 0xFFFF |
| Second-type module | 0x02 | 010B | 01B | 1B | 0xFFFF |
| Third-type module | 0x02 | 010B | 10B | 1B | 0xFFFF |
| System | -- | 001B | 01B | 1B | -- |
FIG. 7
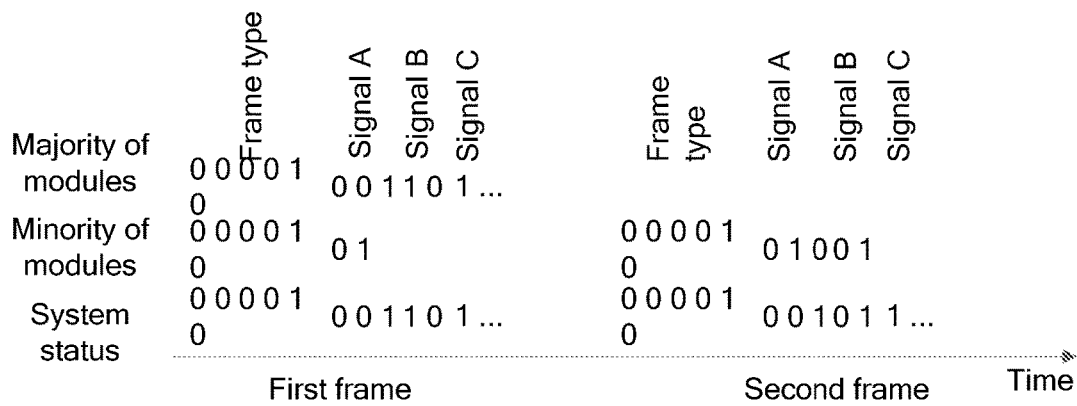
FIG. 8
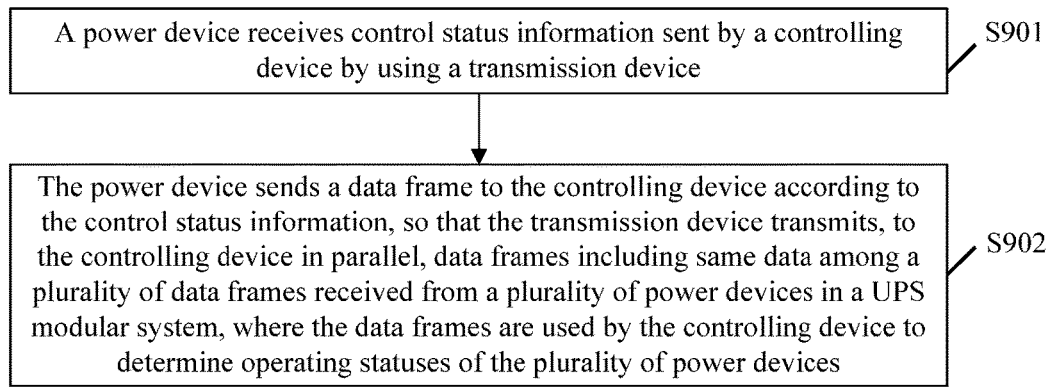
FIG. 9

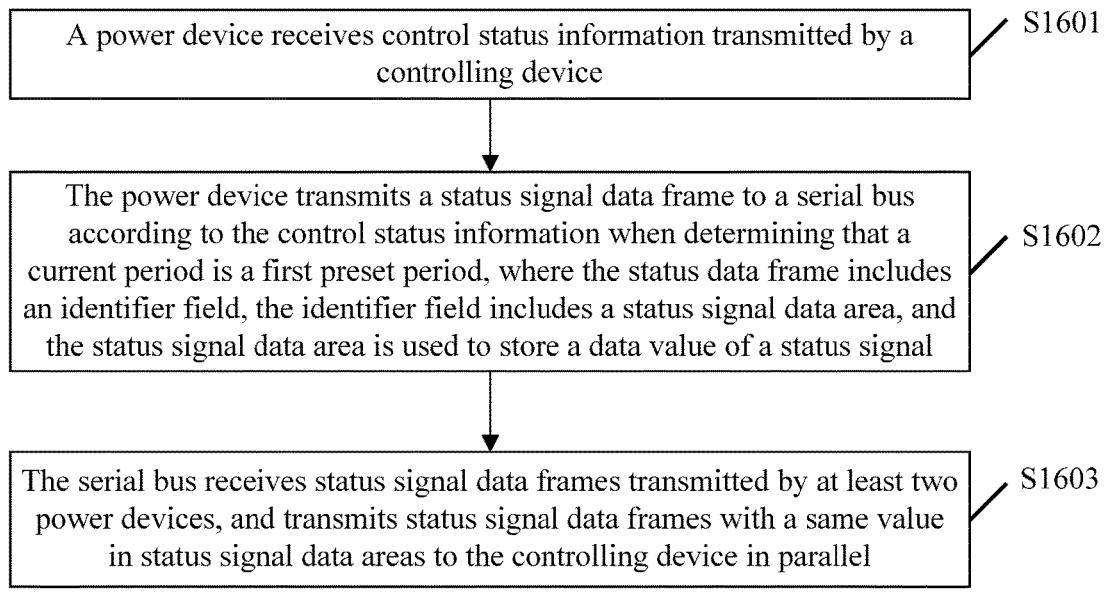

FIG. 16

| Identifier field | | | Data field |
|---|---|---|---|
| Frame type area | Status signal data area | Control signal address area | Control signal data area |
| 1 | Data value of a triggering status signal | All set to 1 | All set to 1 |

FIG. 17

| Identifier field | | | Data field |
|---|---|---|---|
| Frame type area | Status signal data area | Control signal address area | Control signal data area |
| 2 | Data value of a changing status signal | All set to 1 | All set to 1 |

FIG. 18

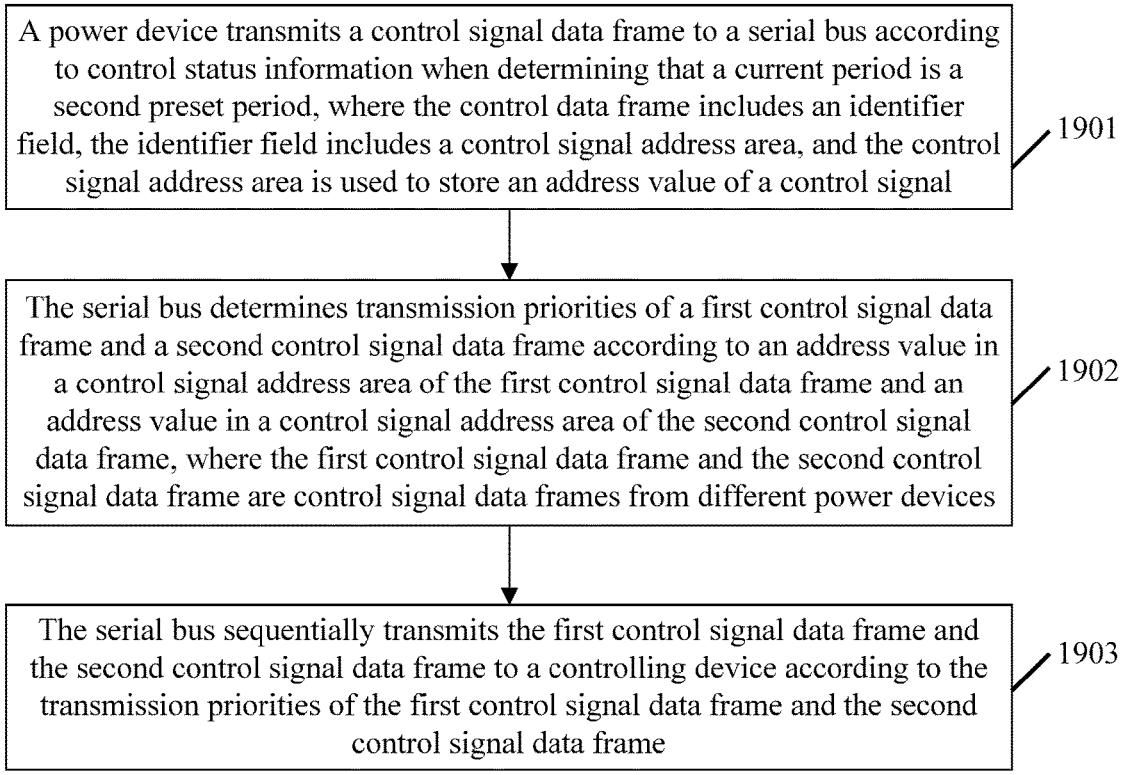
FIG. 19
| Identifier field | | | Data field |
|---|---|---|---|
| Frame type area | Status signal data area | Control signal address area | Control signal data area |
| 3 | All set to 1 | Address value of a power device | Data value of a control signal |
FIG. 20
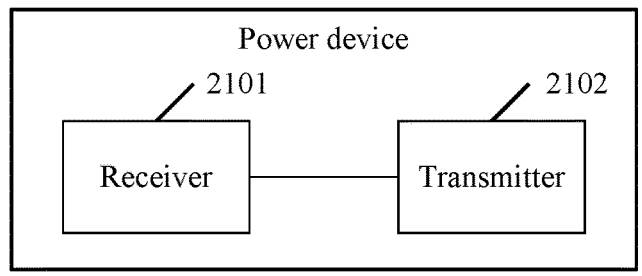
FIG. 21

MODULAR UPS SYSTEM AND DATA TRANSMISSION METHOD FOR POWER DEVICE

CROSS-REFERENCE TO RELATED APPLICATIONS

This application is a continuation of International Application No. PCT/CN2017/102415, filed on Sep. 20, 2017, which claims priority to Chinese Patent Application No. 201611189796.5, filed on Dec. 21, 2016. The disclosures of the aforementioned applications are hereby incorporated by reference in their entireties.

TECHNICAL FIELD

The present disclosure relates to the data transmission field, and in particular, to a modular UPS system and a data transmission method for a power device.

BACKGROUND

Currently, operating of a modular Uninterruptible Power Supply (UPS) system requires transmission of a large amount of real-time data between power devices using a serial bus such as an RS485 bus or a Controller Area Network (CAN) bus. For example, in the modular UPS system, each power device not only needs to transmit control signal data such as current data of the power device to another module or a controlling device, but also needs to transmit some real-time status signal data that can only tolerate a delay of at most 1 milliseconds (ms) to 2 ms. In addition, after data of a power device in the system increases, the serial bus needs to transmit more data, resulting in an increase in usage of the serial bus. The usage indicates a percentage of data transmitted on the serial bus within a specified time period to a maximum amount of transmission that can be carried on the serial bus.

FIG. 1 shows a structure of a control data bus for a modular UPS system. As shown in FIG. 1, a serial bus is used to transmit real-time data of all power devices to a controlling device according to a preset period, or transmit the real-time data to the controlling device in burst mode when a failure or an exception occurs. After receiving the real-time data of all the power devices, the controlling device determines an operating status of the system according to the real-time data. For example, in the modular UPS system, the power devices periodically transmit respective data frames (including control information and status information) to the controlling device/centralized control module in real time using a CAN bus, and meanwhile the controlling device/centralized control module periodically transmits a data frame (including control information and status information) of the system to the power devices in real time. FIG. 2 shows a schematic diagram of transmission bandwidth of a CAN bus. Each module packetizes a control signal and a status signal of the module into a data frame and periodically transmits the data frame to the CAN bus. Because of a contention-based feature of the CAN bus, data frames are transmitted on the CAN bus frame by frame. FIG. 3 shows a schematic structural diagram of a data frame. Each module arranges a signal of the module in a reserved bit in a data field or an identifier (ID) field in the data frame according to a protocol, storing an address of the module in the ID field and storing various signals in the data field. However, in one aspect, with a limited bandwidth capability of a serial bus, a large amount of real-time data restricts increasing of a module quantity, while an increase in the module quantity also reduces real-time quality of data and increases usage of the serial bus. In another aspect, status signal data can only tolerate a delay of at most 1 ms to 2 ms, and an increase in the module quantity increases the delay of the status signal. This data transmission manner restricts expansion of the modular UPS system. For example, in a current UPS system having 20 modules, usage of a CAN bus has reached 75 percent (%), and a status signal delay of some power devices has exceeded 2 ms. Therefore, it is quite difficult to add more modules.

SUMMARY

This application provides a data transmission method and device for a modular UPS system, so as to resolve problems of excessively high usage of a serial bus, a longer transmission delay of a status signal, and inconvenience in modular expansion of the system that are caused by transmission of a large amount of data.

According to a first aspect, an embodiment of this application provides a modular UPS system, where the modular UPS system includes at least two power devices, a controlling device, and a serial bus. The power devices first receive control status information transmitted by the controlling device, and then transmit a status signal data frame to the serial bus according to the control status information when determining that a current period is a first preset period, where the status signal data frame includes an identifier field, the identifier field includes a status signal data area, and the status signal data area is used to store a data value of a status signal. After receiving status signal data frames transmitted by the at least two power devices, the serial bus transmits status signal data frames with a same value in status signal data areas to the controlling device in parallel. In this way, the serial bus in a transmission device is used to transmit in parallel data frames generated by a plurality of modules, thereby reducing usage of the serial bus and helping modular expansion of the system.

In a possible design, the status signal data frame further includes a control signal address area, and the control signal address area is used to store invalid data.

In another possible design, when a data value in a status signal data area of a first status signal data frame is inconsistent with a data value in a status signal data area of a second status signal data frame, transmission priorities of the first status signal data frame and the second status signal data frame are determined according to the data value in the status signal data area of the first status signal data frame and the data value in the status signal data area of the second status signal data frame, where the first status signal data frame and the second status signal data frame are status signal data frames from different power devices, and the serial bus is further configured to sequentially transmit the first status signal data frame and the second status signal data frame to the controlling device according to the transmission priorities of the first status signal data frame and the second status signal data frame. In this way, status signal data frames with different data values are transmitted according to a sequence.

In another possible design, the power device is further configured to transmit a control signal data frame to the serial bus according to the control status information when determining that the current period is a second preset period, where the control data frame includes an identifier field, the identifier field includes a control signal address area, and the control signal address area is used to store an address value of a control signal, the serial bus is configured to determine transmission priorities of a first control signal data frame and a second control signal data frame according to an address value in a control signal address area of the first control signal data frame and an address value in a control signal address area of the second control signal data frame, where the first control signal data frame and the second control signal data frame are control signal data frames from different power devices, and the serial bus is further configured to sequentially transmit the first control signal data frame and the second control signal data frame to the controlling device according to the transmission priorities of the first control signal data frame and the second control signal data frame. In this way, after a plurality of power devices generate a plurality of types of data frames, a sending sequence of the data frames is determined according to priorities of the plurality of types of data frames, and a plurality of data frames of each type are sent in parallel, thereby reducing usage of the bus.

In another possible design, when the control signal data frame further includes a status signal data area, the status signal data area is used to store invalid data.

In another possible design, the serial bus is a CAN bus.

According to a second aspect, this application provides a power device, where the power device is configured to implement a method and a function performed by the power device in the foregoing first aspect, and is implemented by hardware/software, and the hardware/software thereof includes a unit corresponding to the foregoing function.

According to a third aspect, this application provides a data transmission method for a power device, where the data transmission method is implemented and performed by the power device in the first aspect, and is implemented by hardware/software, and the hardware/software thereof includes a unit corresponding to the foregoing function.

According to a fourth aspect, an embodiment of this application provides a data transmission method for a modular UPS system, where the method includes first, receiving, by a transmission device, control status information sent by a controlling device, then, transmitting, by the transmission device, the control status information to a plurality of power devices, and returning, by the plurality of power devices, respective data frames to the transmission device according to the control status information after receiving the control status information, where the data frame does not include identification information of a power device sending the data frame, and finally, transmitting, by the transmission device, data frames including same data among the plurality of data frames to the controlling device in parallel, and determining, by the controlling device, operating statuses of the plurality of power devices according to the data frames after the controlling device receives the data frames. In this way, a serial bus in the transmission device is used to transmit in parallel data frames generated by a plurality of modules, thereby reducing usage of the serial bus and helping modular expansion of the system.

In a possible design, the plurality of power devices generate a plurality of data frames with same data according to the control status information, and the transmission device transmits the plurality of data frames with same data to the controlling device in parallel. In this way, a serial bus in the transmission device is used to transmit all of the plurality of data frames in parallel, thereby reducing usage of the serial bus.

In another possible design, the plurality of power devices generate a plurality of data frames according to the control status information, where the plurality of data frames include at least one first data frame and a plurality of second data frames, a sending sequence of the first data frame and the second data frames is first determined according to a signal value of the first data frame and signal values of the second data frames, where the signal value is used to indicate a data value of a data frame, and the at least one first data frame and the plurality of second data frames are sequentially transmitted to the controlling device according to the sending sequence of the first data frame and the second data frames, where the plurality of second data frames are transmitted in parallel. In this way, after the plurality of power devices generate a plurality of types of data frames, a sending sequence of the data frames is determined according to priorities of the plurality of types of data frames, and a plurality of data frames of each type are sent in parallel, thereby reducing usage of the bus.

According to a fifth aspect, an embodiment of this application provides a data transmission method for a modular UPS system, where the method includes receiving, by a plurality of power devices, control status information sent by a controlling device using a transmission device, sending, by the plurality of power devices, respective data frames to the controlling device according to the control status information, transmitting, by the transmission device to the controlling device in parallel after receiving a plurality of data frames, data frames including same data among the plurality of data frames received from the plurality of power devices in the modular UPS system, and finally determining, by the controlling device, operating statuses of the plurality of power devices according to the plurality of data frames, where the data frame does not include identification information of a power device sending the data frame. When the power devices generate the data frames according to the control status information, the power devices remove identification information of the power devices in original data frames, so that the plurality of power devices generate data frames wherein the data in the data frames are the same. In this way, a serial bus in the transmission device is used to transmit the data frames with same data in parallel, thereby reducing usage of the serial bus and helping modular expansion of the system.

In a possible design, the plurality of power devices receive the control status information sent by the controlling device according to a preset period using the transmission device.

In another possible design, the plurality of power devices generate a plurality of data frames with same data according to the control status information, and send the plurality of data frames with same data to the controlling device, so that the transmission device transmits the plurality of data frames with same data to the controlling device in parallel.

In another possible design, the plurality of power devices first generate a plurality of data frames according to the control status information, where the plurality of data frames include at least two types of data frames, and the at least two types of data frames may include at least one first data frame and a plurality of second data frames, and then send the at least two types of data frames to the transmission device at a target time point in a preset period, so that the transmission device transmits the at least two types of data frames to the controlling device in parallel.

According to a sixth aspect, an embodiment of this application provides a data transmission device for a modular UPS system, including first, an information receiving module, configured to receive control status information sent by a controlling device, then, an information transmission module, configured to transmit the control status information to a plurality of power devices, so that the plurality of power devices return respective data frames to the transmission device according to the control status information, where the data frame does not include identification information of a power device sending the data frame, and finally, a data transmission module, configured to transmit data frames including same data among the plurality of data frames to the controlling device in parallel, where the data frames are used by the controlling device to determine operating statuses of the plurality of power devices. In this way, a serial bus in the transmission device is used to transmit in parallel data frames generated by a plurality of modules, thereby reducing usage of the serial bus and helping modular expansion of the system.

In a possible design, the plurality of power devices generate a plurality of data frames with same data according to the control status information, and the data transmission module is configured to transmit the plurality of data frames with same data to the controlling device in parallel. In this way, a serial bus in the transmission device is used to transmit all of the plurality of data frames in parallel, thereby reducing usage of the serial bus.

In another possible design, the plurality of power devices generate a plurality of data frames according to the control status information, the plurality of data frames include at least one first data frame and a plurality of second data frames, and the data transmission module is configured to first, determine a sending sequence of the first data frame and the second data frames according to a signal value of the first data frame and signal values of the second data frames, where the signal value is used to indicate a data value of a data frame, and then, sequentially transmit the at least one first data frame and the plurality of second data frames to the controlling device according to the sending sequence of the first data frame and the second data frames, where the plurality of second data frames are transmitted in parallel. In this way, after the plurality of power devices generate a plurality of types of data frames, a sending sequence of the data frames is determined according to priorities of the plurality of types of data frames, and a plurality of data frames of each type are sent in parallel, thereby reducing usage of the bus.

According to a seventh aspect, an embodiment of this application provides a data transmission device for a modular UPS system, including an information receiving module, configured to receive control status information sent by a controlling device, and a data sending module, configured to send to the controlling device according to the control status information, so that the transmission device transmits data frames including same data among a plurality of data frames to the controlling device in parallel, where the data frames are used by the controlling device to determine operating statuses of a plurality of power devices, and the data frames do not include identification information of power devices sending the data frames. When the power devices generate the data frames according to the control status information, the power devices remove identification information of the power devices in original data frames, so that the plurality of power devices generate data frames wherein the data in the data frames are the same. In this way, a serial bus in the transmission device is used to transmit the data frames with same data in parallel, thereby reducing usage of the serial bus and helping modular expansion of the system.

In a possible design, the information receiving module is configured to receive the control status information sent by the controlling device according to a preset period using the transmission device.

According to an eighth aspect, an embodiment of this application provides a data transmission device for a modular UPS system, where the device includes a serial bus, a transceiver, a memory, and a controller, the memory stores a set of program code, and the controller is configured to invoke the program code stored in the memory, to control the serial bus to perform the following operations, first, receiving control status information sent by a controlling device, then, transmitting the control status information to a plurality of power devices, where the plurality of power devices return respective data frames to the transmission device according to the control status information after receiving the control status information, where the data frame does not include identification information of a power device sending the data frame, and finally, transmitting data frames including same data among the plurality of data frames to the controlling device in parallel, where the controlling device determines operating statuses of the plurality of power devices according to the data frames after receiving the data frames. In this way, the serial bus in the transmission device is used to transmit in parallel a plurality of data frames generated by a plurality of modules, thereby reducing usage of the serial bus and helping modular expansion of the system.

In a possible design, the controller controls the serial bus to further perform the following operation, transmitting, for the transmission device, a plurality of data frames with same data to the controlling device in parallel. In this way, the serial bus is used to transmit all of the plurality of data frames in parallel, thereby reducing usage of the serial bus.

In another possible design, the plurality of power devices generate a plurality of data frames according to the control status information, the plurality of data frames include at least one first data frame and a plurality of second data frames, and the controller controls the serial bus to further perform the following operations, first, determining a sending sequence of the first data frame and the second data frames according to a signal value of the first data frame and signal values of the second data frames, where the signal value is used to indicate a data value of a data frame, and sequentially transmitting the at least one first data frame and the plurality of second data frames to the controlling device according to the sending sequence of the first data frame and the second data frames, where the plurality of second data frames are transmitted in parallel. In this way, after the plurality of power devices generate a plurality of types of data frames, a sending sequence of the data frames is determined according to priorities of the plurality of types of data frames, and a plurality of data frames of each type are sent in parallel, thereby reducing usage of the bus.

According to a ninth aspect, an embodiment of this application provides a data sending device for a modular UPS system, where the device includes a network interface, a memory, and a processor, the memory stores a set of program code, and the processor is configured to invoke the program code stored in the memory, to perform the following operations, receiving control status information sent by a controlling device using a transmission device, and sending a data frame to the controlling device according to the control status information, so that the transmission device transmits, to the controlling device in parallel, data frames including same data among a plurality of data frames received from a plurality of power devices in the modular UPS system, where the data frames are used by the controlling device to determine operating statuses of the plurality of power devices, and the data frames do not include identification information of power devices sending the data frames.

In a possible design, the processor is further configured to perform the following operation, receiving the control status information sent by the controlling device according to a preset period using the transmission device.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show some embodiments of the present disclosure, and a person of ordinary skill in the art may still derive other drawings from these accompanying drawings without creative efforts.

FIG. 1 shows a structure of a control data bus in a modular UPS system in a prior-art technical solution.

FIG. 2 is a schematic diagram of transmission bandwidth of a CAN bus in a prior-art technical solution.

FIG. 3 is a schematic structural diagram of a data frame in a prior-art technical solution.

FIG. 7 is a schematic structural diagram of still another data frame according to an embodiment of the present disclosure.

FIG. 8 is a schematic diagram of data frame transmission according to an embodiment of the present disclosure.

FIG. 9 is a flowchart of a second embodiment of a data transmission method for a modular UPS system according to the present disclosure.

FIG. 16 is a schematic flowchart of another data transmission method for a modular UPS system according to an embodiment of the present disclosure.

FIG. 17 is a schematic diagram of a frame structure of a status signal data frame according to an embodiment of the present disclosure.

FIG. 18 is a schematic diagram of a frame structure of another status signal data frame according to an embodiment of the present disclosure.

FIG. 19 is a schematic flowchart of a data transmission method for a modular UPS system according to another embodiment of the present disclosure.

FIG. 20 is a schematic diagram of a frame structure of a control signal data frame according to an embodiment of the present disclosure.

FIG. 21 is a schematic structural diagram of a power device according to an embodiment of the present disclosure.

DESCRIPTION OF EMBODIMENTS

The following clearly describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

Figures 4, 5, 6:
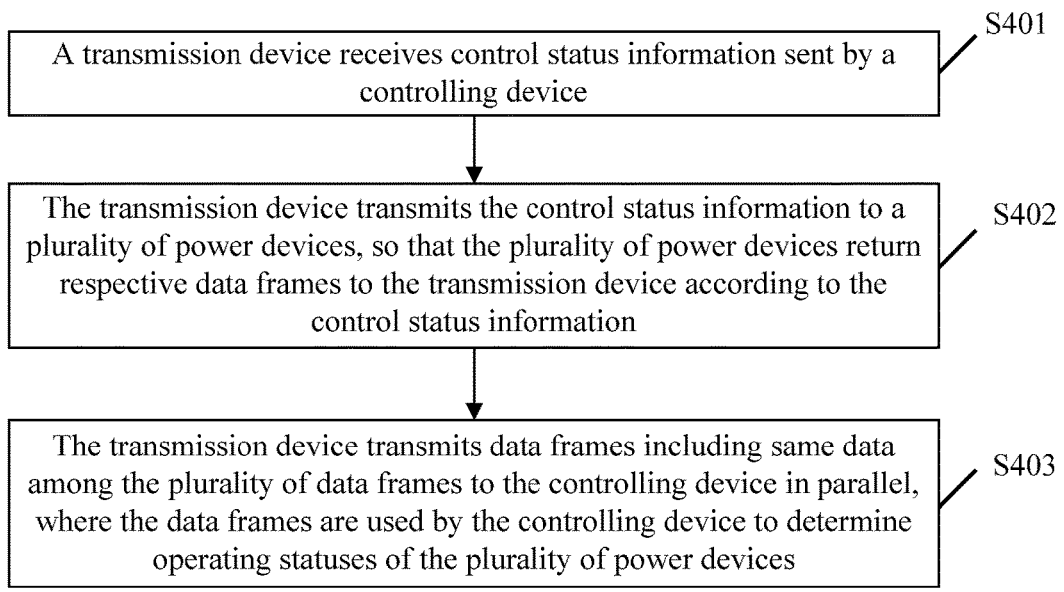
FIG. 4 is a flowchart of a first embodiment of a data transmission method for a modular UPS system according to the present disclosure.
FIG. 5 is a schematic structural diagram of a data frame according to an embodiment of the present disclosure.
FIG. 6 is a schematic structural diagram of another data frame according to an embodiment of the present disclosure.

Referring to FIG. 4, FIG. 4 is a flowchart of a first embodiment of a data transmission method for a modular UPS system according to the present disclosure. As shown in FIG. 4, the method in this embodiment of the present disclosure includes the following steps.

S401. A transmission device receives control status information sent by a controlling device.

During specific implementation, as shown in FIG. 1, each module in the modular UPS system is a device having a hardware entity. The modular UPS system includes a transmission device, a plurality of power devices, and a controlling device. Communication connections between the controlling device and the plurality of power devices are established using the transmission device. The transmission device in the system transmits real-time data of all the power devices to the controlling device, or transmits the real-time data to the controlling device in burst mode when a failure or an exception occurs. After receiving the real-time data of all the power devices, the controlling device determines operating statuses of the power modules according to the real-time data. The transmission device includes a serial bus, a controller, a transceiver, and the like, and integrates functions of a physical layer and a data link layer of a network protocol. The transmission device may complete framing processing of communication data, including services such as bit stuffing, data block encoding, cyclic redundancy check, and priority determining. The plurality of power devices operate in a same manner. Each power device transmits current data of the power device to the controlling device using the transmission device, and each power device may be used as a part of an entire power output system. In addition, the controlling device may send the control status information according to a preset period using the transmission device, so as to periodically obtain data frames of the plurality of power devices and further determine the operating statuses of the plurality of power devices.

S402. The transmission device transmits the control status information to a plurality of power devices, so that the plurality of power devices return respective data frames to the transmission device according to the control status information, where the data frame does not include identification information of a power device sending the data frame.

During specific implementation, the plurality of power devices may generate a plurality of data frames with same data according to the control status information, and return respective data frames to the transmission device. The data frame may be an event data frame. The event data frame includes an identifier field and a data field. The identifier field in the event data frame includes a plurality of event signals, and each event signal includes one bit of data. For example, as shown in FIG. 5, a signal A includes one bit of data, a signal B includes one bit of data, and a signal C includes one bit of data. After the plurality of power devices receive the control status information, if a signal A of a power device changes, signals A of all the power devices change and are triggered to eventually obtain data frames with same data. The event data frame requires that the controlling device respond quickly, usually within 2 ms.

Optionally, the plurality of power devices may generate at least two types of data frames according to the control status information, and send the at least two types of data frames to the transmission device at a target time point in the preset period, where the at least two types of data frames may include at least one first data frame and a plurality of second data frames. The data frame may be a fast data frame. The fast data frame includes an identifier field and a data field. The identifier field in the fast data frame includes a plurality of fast signals, and each fast signal in the fast data frame includes at least one bit of data. For example, as shown in FIG. 6 and FIG. 7, a signal A includes three bits of data, a signal B includes two bits of data, and a signal C includes one bit of data. In FIG. 6, the signal A changes from original 010B to 001B, and the signal B changes from original 01B to 10B. Signals A and signals B of a majority of power modules are triggered to obtain a first data frame, while signals A and signals B of a minority of power modules are not triggered for change, so that a second data frame is obtained. As shown in FIG. 7, the signal A changes from original 010 to 001B, the signal B changes from original 10B to 01B, and three types of data frames are eventually obtained by triggering. A signal A of a first-type power module is triggered to obtain a first data frame, a signal B of a second-type power module is triggered to obtain a second data frame, and a signal of a third-type power module is not triggered for change, so that a third data frame is obtained. Each type of fast data frame has a priority, and the priority may be determined according to a signal value. A smaller signal value indicates a higher priority, and a signal value may be a data value of a data frame. As shown in FIG. 6, because a value of the signal A in the first data frame is less than a value of the signal A in the second data frame, a priority of the first data frame is higher than that of the second data frame.

In addition, the plurality of power devices may generate, according to the control status information, some other data frames that do not require urgent transmission. This type of data frame does not require a high speed of transmission, and generally, transmission in 20 ms or 30 ms is acceptable. Therefore, this type of data frame does not need to be transmitted in parallel, and this type of data frame is not considered in this embodiment of the present disclosure.

S403. The transmission device transmits data frames including same data among the plurality of data frames to the controlling device in parallel, where the data frames are used by the controlling device to determine operating statuses of the plurality of power devices.

During specific implementation, the transmission device may transmit the plurality of data frames with same data to the controlling device in parallel. If the transmission device cannot transmit all of the plurality of data frames at a time, the transmission device may first transmit one portion of the plurality of data frames, and then transmit the other portion of the plurality of data frames after the transmission device becomes idle. Because the plurality of data frames sent by all the power devices include same data, after the controlling device receives the data frames, an operating status of the system is determined according to the plurality of data frames wherein the data in the data frames are the same.

Optionally, the plurality of data frames include at least one first data frame and a plurality of second data frames. The transmission device may determine a sending sequence of the first data frame and the second data frames according to a signal value of the first data frame and signal values of the second data frames, where the signal value is used to indicate a data value of a data frame, and sequentially transmit the at least one first data frame and the plurality of second data frames to the controlling device according to the sending sequence of the first data frame and the second data frames, where the plurality of second data frames are transmitted in parallel. For example, as shown in FIG. 6, because the signal value of the first data frame is less than the signal values of the second data frames, the transmission device first transmits the at least one first data frame, and then transmits the plurality of second data frames in parallel after transmission of the first data frame is completed. After receiving the plurality of data frames, the controlling device may determine the operating statuses of the plurality of power devices according to the plurality of data frames transmitted by the transmission device. In addition, the plurality of data frames may include at least two types of data frames. As shown in FIG. 7, because the operating status of the system may be determined according to the first data frame and the second data frame (001 of the signal A, 01B of the signal B, and 1B of the signal C), the transmission device may choose to abandon transmission of the third data frame.

Further, the controlling device may obtain a data value of each fast signal in the first data frame and a data value of each fast signal in the second data frames, determine a priority of each fast signal in the first data frame and the second data frames according to the data value of each fast signal in the first data frame and the data value of each fast signal in the second data frames, select a fast signal with a high priority from the first data frame and the second data frames according to the priority of each fast signal in the first data frame and the second data frames, to form a target data frame, and determine the operating statuses of the plurality of power devices according to the target data frame. For example, as shown in FIG. 8, in the first frame, a priority of a signal A in a first data frame generated by a majority of modules is higher than a priority of a signal A in a second data frame generated by a minority of modules, and therefore, the signal A in the first data frame, a signal B in the first data frame, and a signal C in the first data frame may be selected to form a target data frame, and in the second frame, a priority of a signal A in a first data frame generated by a majority of modules is higher than a priority of a signal A in a second data frame generated by a minority of modules, and a priority of a signal B in the first data frame is lower than a priority of a signal B in the second data frame, and therefore, the signal A in the first data frame and the signal B and a signal C in the second data frame may be selected to form a target data frame. A smaller data value of a fast signal indicates a higher priority of the fast signal.

In this embodiment of the present disclosure, first, the transmission device receives the control status information sent by the controlling device, then, the transmission device transmits the control status information to the plurality of power devices, and the plurality of power devices return respective data frames to the transmission device according to the control status information after receiving the control status information, where the data frame does not include the identification information of the power device sending the data frame, and finally, the transmission device transmits the data frames including same data among the plurality of data frames to the controlling device in parallel, and the controlling device determines the operating statuses of the plurality of power devices according to the data frames after the controlling device receives the data frames. In this way, the serial bus in the transmission device is used to transmit in parallel data frames generated by a plurality of modules, thereby reducing usage of the serial bus and helping modular expansion of the system.

Referring to FIG. 9, FIG. 9 is a flowchart of a second embodiment of a data transmission method for a modular UPS system according to the present disclosure. As shown in FIG. 9, the method in this embodiment of the present disclosure includes the following steps.

S901. A plurality of power devices receive control status information sent by a controlling device using a transmission device.

During specific implementation, the plurality of power devices may receive the control status information sent by the controlling device according to a preset period using the transmission device. First, the controlling device transmits the control status information to the plurality of power devices using the transmission device. Then, after receiving the control status information, the plurality of power devices generate a plurality of data frames according to the control status information.

S902. The plurality of power devices send respective data frames to the controlling device according to the control status information, so that the transmission device transmits, to the controlling device in parallel, data frames including same data among the plurality of data frames received from the plurality of power devices in the modular UPS system, where the data frames are used by the controlling device to determine operating statuses of the plurality of power devices, and the data frames do not include identification information of power devices sending the data frames.

During specific implementation, the plurality of power devices may generate a plurality of data frames with same data according to the control status information, and return respective data frames to the transmission device, and the transmission device may transmit the plurality of data frames with same data to the controlling device in parallel. The data frame may be an event data frame. The event data frame includes an identifier field and a data field. The identifier field in the event data frame includes a plurality of event signals, and each event signal includes one bit of data. For example, as shown in FIG. 5, a signal A includes one bit of data, a signal B includes one bit of data, and a signal C includes one bit of data. After the plurality of power modules receive the control status information, if a signal A of a power module changes, signals A of all the power modules change and are triggered to eventually obtain data frames with same data. The event data frame requires that the controlling device respond quickly, usually within 2 ms.

Figure 10:
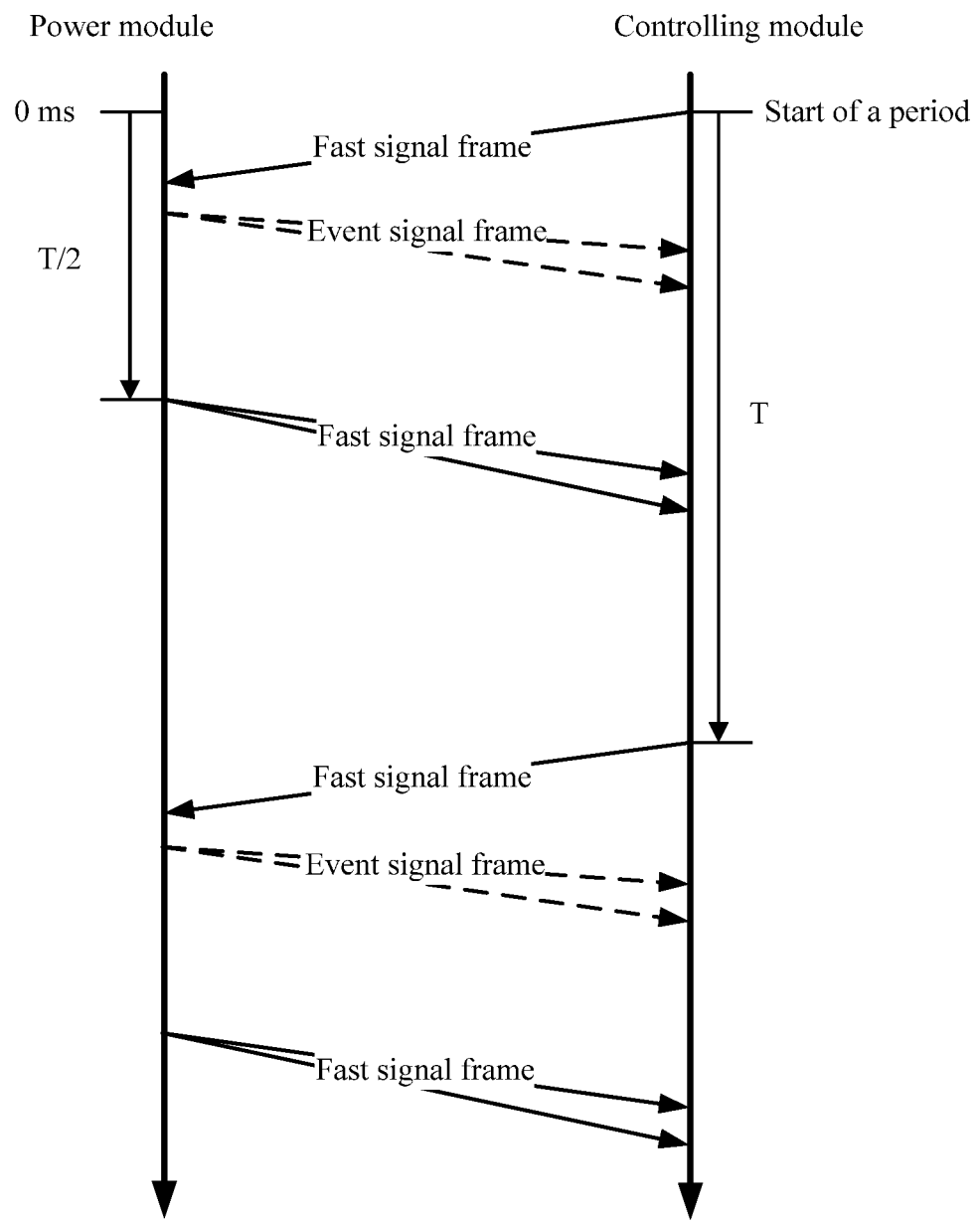
FIG. 10 is a schematic diagram of data frame exchange according to an embodiment of the present disclosure.

Optionally, the plurality of power devices may generate at least two types of data frames according to the control status information, and send the at least two types of data frames to the transmission device at a target time point in the preset period, where the at least two types of data frames may include at least one first data frame and a plurality of second data frames. For example, as shown in FIG. 10, after receiving the control status information, the plurality of power devices send the data frames not immediately, but send the at least two types of data frames to the transmission device with a delay of a half of the preset period from a start time point of the preset period. After receiving the data frames, the transmission device may determine a sending sequence of the first data frame and the second data frames according to a signal value of the first data frame and signal values of the second data frames, where the signal value is used to indicate a data value of a data frame, and sequentially transmit the at least one first data frame and the plurality of second data frames to the controlling device according to the sending sequence of the first data frame and the second data frames, where the plurality of second data frames are transmitted in parallel. The data frame may be a fast data frame. The fast data frame includes an identifier field and a data field. The identifier field in the fast data frame includes a plurality of fast signals, and each fast signal in the fast data frame includes at least one bit of data. For example, as shown in FIG. 6 and FIG. 7, a signal A includes three bits of data, a signal B includes two bits of data, and a signal C includes one bit of data. In FIG. 6, the signal A changes from original 010B to 001B, and the signal B changes from original 01B to 10B. Signals A and signals B of a majority of power modules are triggered to obtain a first data frame, while signals A and signals B of a minority of power modules are not triggered for change, so that a second data frame is obtained. As shown in FIG. 7, the signal A changes from original 010 to 001B, the signal B changes from original 10B to 01B, and three types of data frames are eventually obtained by triggering. A signal A of a first-type power module is triggered to obtain a first data frame, a signal B of a second-type power module is triggered to obtain a second data frame, and a signal of a third-type power module is not triggered for change, so that a third data frame is obtained. Each type of fast data frame has a priority, and the priority may be determined according to a signal value. A smaller signal value indicates a higher priority, and a signal value may be a data value of a data frame. As shown in FIG. 6, because a value of the signal A in the first data frame is less than a value of the signal A in the second data frame, a priority of the first data frame is higher than that of the second data frame.

In addition, the plurality of power devices may generate, according to the control status information, some other data frames that do not require urgent transmission. This type of data frame does not require a high speed of transmission, and generally, transmission in 20 ms or 30 ms is acceptable. Therefore, this type of data frame does not need to be transmitted in parallel, and this type of data frame is not considered in this embodiment of the present disclosure.

Further, the controlling device may obtain a data value of each fast signal in the first data frame and a data value of each fast signal in the second data frames, determine a priority of each fast signal in the first data frame and the second data frames according to the data value of each fast signal in the first data frame and the data value of each fast signal in the second data frames, select a fast signal with a high priority from the first data frame and the second data frames according to the priority of each fast signal in the first data frame and the second data frames, to form a target data frame, and determine the operating statuses of the plurality of power modules according to the target data frame. For example, as shown in FIG. 8, in the first frame, a priority of a signal A in a first data frame generated by a majority of modules is higher than a priority of a signal A in a second data frame generated by a minority of modules, and therefore, the signal A in the first data frame, a signal B in the first data frame, and a signal C in the first data frame may be selected to form a target data frame, in the second frame, a priority of a signal A in a first data frame generated by a majority of modules is higher than a priority of a signal A in a second data frame generated by a minority of modules, and a priority of a signal B in the first data frame is lower than a priority of a signal B in the second data frame, and therefore, the signal A in the first data frame and the signal B and a signal C in the second data frame may be selected to form a target data frame. A smaller data value of a fast signal indicates a higher priority of the fast signal.

In this embodiment of the present disclosure, first, the plurality of power devices receive the control status information sent by the controlling device using the transmission device, then, the plurality of power devices send respective data frames to the controlling device according to the control status information, and after receiving the plurality of data frames, the transmission device transmits the data frames including same data among the plurality of data frames to the controlling device in parallel, and finally, the controlling device determines the operating statuses of the plurality of power devices according to the plurality of data frames, where the data frame does not include the identification information of the power device sending the data frame. When the power devices generate the data frames according to the control status information, the power devices remove identification information of the power devices in original data frames, so that the plurality of power devices generate data frames wherein the data in the data frames are the same. In this way, a serial bus in the transmission device is used to transmit the data frames with same data in parallel, thereby reducing usage of the serial bus and helping modular expansion of the system.

Figure 11:
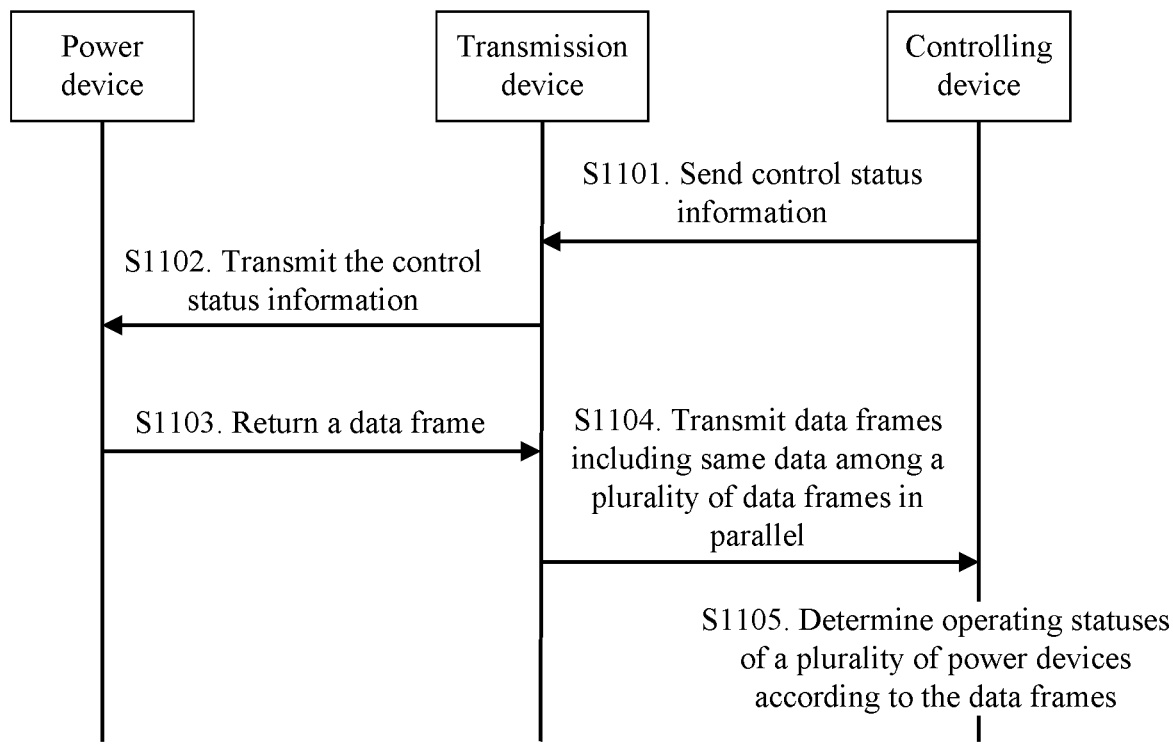
FIG. 11 is a schematic flowchart of a data transmission system according to an embodiment of the present disclosure.

Referring to FIG. 11, FIG. 11 is a schematic flowchart of a data transmission system according to an embodiment of the present disclosure. As shown in FIG. 11, the method in this embodiment of the present disclosure includes the following steps.

S1101. A controlling device sends control status information to a transmission device.

During specific implementation, the system includes a transmission device, a plurality of power devices, and a controlling device. Communication connections between the controlling device and the plurality of power devices are established using the transmission device. The transmission device includes a serial bus, a controller, a transceiver, and the like, and integrates functions of a physical layer and a data link layer of a network protocol. The transmission device may complete framing processing of communication data, including services such as bit stuffing, data block encoding, cyclic redundancy check, and priority determining. The plurality of power devices operate in a same manner. Each power device transmits current data of the power device to the controlling device using the transmission device, and each power device may be used as a part of an entire power output system. In addition, the controlling device may send the control status information according to a preset period using the transmission device, so as to periodically obtain data frames of the plurality of power devices and further determine operating statuses of the plurality of power devices.

S1102. The transmission device transmits the control status information to a plurality of power devices.

S1103. The plurality of power devices return respective data frames to the transmission device according to the control status information, where the data frame does not include identification information of a power device sending the data frame.

During specific implementation, the plurality of power devices may generate a plurality of data frames with same data according to the control status information, and return respective data frames to the transmission device. The data frame may be an event data frame. The event data frame includes an identifier field and a data field. The identifier field in the event data frame includes a plurality of event signals, and each event signal includes one bit of data. For example, as shown in FIG. 5, a signal A includes one bit of data, a signal B includes one bit of data, and a signal C includes one bit of data. After the plurality of power devices receive the control status information, if a signal A of a power device changes, signals A of all the power devices change and are triggered to eventually obtain data frames with same data. The event data frame requires that the controlling device respond quickly, usually within 2 ms.

Optionally, the plurality of power devices may generate at least two types of data frames according to the control status information, and send the at least two types of data frames to the transmission device at a target time point in the preset period, where the at least two types of data frames may include at least one first data frame and a plurality of second data frames. The data frame may be a fast data frame. The fast data frame includes an identifier field and a data field. The identifier field in the fast data frame includes a plurality of fast signals, and each fast signal in the fast data frame includes at least one bit of data. For example, as shown in FIG. 6 and FIG. 7, a signal A includes three bits of data, a signal B includes two bits of data, and a signal C includes one bit of data. In FIG. 6, the signal A changes from original 010B to 001B, and the signal B changes from original 01B to 10B. Signals A and signals B of a majority of power modules are triggered to obtain a first data frame, while signals A and signals B of a minority of power modules are not triggered for change, so that a second data frame is obtained. As shown in FIG. 7, the signal A changes from original 010 to 001B, the signal B changes from original 10B to 01B, and three types of data frames are eventually obtained by triggering. A signal A of a first-type power module is triggered to obtain a first data frame, a signal B of a second-type power module is triggered to obtain a second data frame, and a signal of a third-type power module is not triggered for change, so that a third data frame is obtained. Each type of fast data frame has a priority, and the priority may be determined according to a signal value. A smaller signal value indicates a higher priority, and a signal value may be a data value of a data frame. As shown in FIG. 6, because a value of the signal A in the first data frame is less than a value of the signal A in the second data frame, a priority of the first data frame is higher than that of the second data frame.

In addition, the plurality of power devices may generate, according to the control status information, some other data frames that do not require urgent transmission. This type of data frame does not require a high speed of transmission, and generally, transmission in 20 ms or 30 ms is acceptable. Therefore, this type of data frame does not need to be transmitted in parallel, and this type of data frame is not considered in this embodiment of the present disclosure.

S1104. The transmission device transmits data frames including same data among the plurality of data frames to the controlling device in parallel.

During specific implementation, the transmission device may transmit the plurality of data frames with same data to the controlling device in parallel. Particularly, if the transmission device cannot transmit all of the plurality of data frames at a time, the transmission device may first transmit one portion of the plurality of data frames, and then transmit the other portion of the plurality of data frames after the transmission device becomes idle. Because the plurality of data frames sent by all the power devices include same data, after the controlling device receives the data frames, an operating status of the system is determined according to the plurality of data frames wherein the data in the data frames are the same.

Optionally, the plurality of data frames include at least one first data frame and a plurality of second data frames. The transmission device may determine a sending sequence of the first data frame and the second data frames according to a signal value of the first data frame and signal values of the second data frames, where the signal value is used to indicate a data value of a data frame, and sequentially transmit the at least one first data frame and the plurality of second data frames to the controlling device according to the sending sequence of the first data frame and the second data frames, where the plurality of second data frames are transmitted in parallel. For example, as shown in FIG. 6, because the signal value of the first data frame is less than the signal values of the second data frames, the transmission device first transmits the at least one first data frame, and then transmits the plurality of second data frames in parallel after transmission of the first data frame is completed. After receiving the plurality of data frames, the controlling device may determine the operating statuses of the plurality of power devices according to the plurality of data frames transmitted by the transmission device. In addition, the plurality of data frames may include at least two types of data frames. As shown in FIG. 7, because the operating status of the system may be determined according to the first data frame and the second data frame (001 of the signal A, 01B of the signal B, and 1B of the signal C), the transmission device may choose to abandon transmission of the third data frame.

S1105. The controlling device determines operating statuses of the plurality of power devices according to the data frames.

During specific implementation, the controlling device may obtain a data value of each fast signal in the first data frame and a data value of each fast signal in the second data frames, determine a priority of each fast signal in the first data frame and the second data frames according to the data value of each fast signal in the first data frame and the data value of each fast signal in the second data frames, select a fast signal with a high priority from the first data frame and the second data frames according to the priority of each fast signal in the first data frame and the second data frames, to form a target data frame, and determine the operating statuses of the plurality of power devices according to the target data frame. For example, as shown in FIG. 8, in the first frame, a priority of a signal A in a first data frame generated by a majority of modules is higher than a priority of a signal A in a second data frame generated by a minority of modules, and therefore, the signal A in the first data frame, a signal B in the first data frame, and a signal C in the first data frame may be selected to form a target data frame, and in the second frame, a priority of a signal A in a first data frame generated by a majority of modules is higher than a priority of a signal A in a second data frame generated by a minority of modules, and a priority of a signal B in the first data frame is lower than a priority of a signal B in the second data frame, and therefore, the signal A in the first data frame and the signal B and a signal C in the second data frame may be selected to form a target data frame. A smaller data value of a fast signal indicates a higher priority of the fast signal.

In this embodiment of the present disclosure, first, the transmission device receives the control status information sent by the controlling device, then, the transmission device transmits the control status information to the plurality of power devices, and the plurality of power devices return respective data frames to the transmission device according to the control status information after receiving the control status information, where the data frame does not include the identification information of the power device sending the data frame, and finally, the transmission device transmits the data frames including same data among the plurality of data frames to the controlling device in parallel, and the controlling device determines the operating statuses of the plurality of power devices according to the data frames after the controlling device receives the data frames. In this way, the serial bus in the transmission device is used to transmit in parallel data frames generated by a plurality of modules, thereby reducing usage of the serial bus and helping modular expansion of the system.

Figure 12:
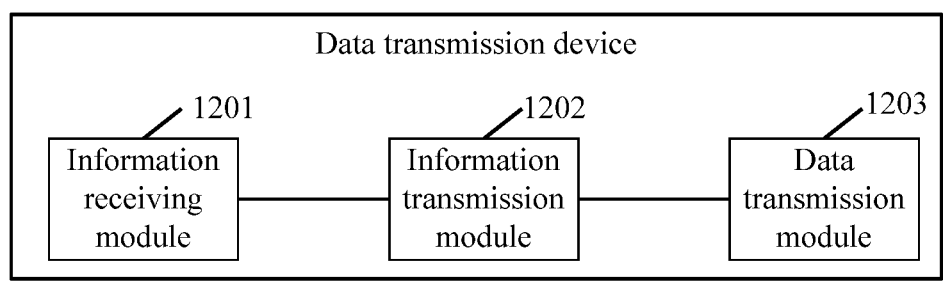
FIG. 12 is a schematic structural diagram of a data transmission device for a modular UPS system according to an embodiment of the present disclosure.

Referring to FIG. 12, FIG. 12 is a schematic structural diagram of a data transmission device for a modular UPS system according to an embodiment of the present disclosure. As shown in FIG. 12, the device in this embodiment of the present disclosure includes an information receiving module 1201, an information transmission module 1202, and a data transmission module 1203.

The information receiving module 1201 is configured to receive control status information sent by a controlling device.

During specific implementation, the system includes the transmission device, a plurality of power devices, and the controlling device. Communication connections between the controlling device and the plurality of power devices are established using the transmission device. The transmission device includes a serial bus, a controller, a transceiver, and the like, and integrates functions of a physical layer and a data link layer of a network protocol. The transmission device may complete framing processing of communication data, including services such as bit stuffing, data block encoding, cyclic redundancy check, and priority determining. The plurality of power devices operate in a same manner. Each power device transmits current data of the power device to the controlling device using the transmission device, and each power device may be used as a part of an entire power output system. In addition, the controlling device may send the control status information according to a preset period using the transmission device, so as to periodically obtain data frames of the plurality of power devices and further determine operating statuses of the plurality of power devices.

The information transmission module 1202 is configured to transmit the control status information to a plurality of power devices, so that the plurality of power devices return respective data frames to the transmission device according to the control status information, where the data frame does not include identification information of a power device sending the data frame.

During specific implementation, the plurality of power devices may generate a plurality of data frames with same data according to the control status information, and return respective data frames to the transmission device. The data frame may be an event data frame. The event data frame includes an identifier field and a data field. The identifier field in the event data frame includes a plurality of event signals, and each event signal includes one bit of data. For example, as shown in FIG. 5, a signal A includes one bit of data, a signal B includes one bit of data, and a signal C includes one bit of data. After the plurality of power devices receive the control status information, if a signal A of a power device changes, signals A of all the power devices change and are triggered to eventually obtain data frames with same data. The event data frame requires that the controlling device respond quickly, usually within 2 ms.

Optionally, the plurality of power devices may generate at least two types of data frames according to the control status information, and send the at least two types of data frames to the transmission device at a target time point in the preset period, where the at least two types of data frames may include at least one first data frame and a plurality of second data frames. The data frame may be a fast data frame. The fast data frame includes an identifier field and a data field. The identifier field in the fast data frame includes a plurality of fast signals, and each fast signal in the fast data frame includes at least one bit of data. For example, as shown in FIG. 6 and FIG. 7, a signal A includes three bits of data, a signal B includes two bits of data, and a signal C includes one bit of data. In FIG. 6, the signal a changes from original 010B to 001B, and the signal B changes from original 01B to 10B. Signals A and signals B of a majority of power devices are triggered to obtain a first data frame, while signals A and signals B of a minority of power modules are not triggered for change, so that a second data frame is obtained. As shown in FIG. 7, the signal A changes from original 010 to 001B, the signal B changes from original 10B to 01B, and three types of data frames are eventually obtained by triggering. A signal A of a first-type power module is triggered to obtain a first data frame, a signal B of a second-type power module is triggered to obtain a second data frame, and a signal of a third-type power module is not triggered for change, so that a third data frame is obtained. Each type of fast data frame has a priority, and the priority may be determined according to a signal value. A smaller signal value indicates a higher priority, and a signal value may be a data value of a data frame. As shown in FIG. 6, because a value of the signal A in the first data frame is less than a value of the signal A in the second data frame, a priority of the first data frame is higher than that of the second data frame.

In addition, the plurality of power devices may generate, according to the control status information, some other data frames that do not require urgent transmission. This type of data frame does not require a high speed of transmission, and generally, transmission in 20 ms or 30 ms is acceptable. Therefore, this type of data frame does not need to be transmitted in parallel, and this type of data frame is not considered in this embodiment of the present disclosure.

The data transmission module 1203 is configured to transmit data frames including same data among the plurality of data frames to the controlling device in parallel, where the data frames are used by the controlling device to determine operating statuses of the plurality of power devices.

During specific implementation, the transmission device may transmit the plurality of data frames with same data to the controlling device in parallel. Particularly, if the transmission device cannot transmit all of the plurality of data frames at a time, the transmission device may first transmit one portion of the plurality of data frames, and then transmit the other portion of the plurality of data frames after the transmission device becomes idle. Because the plurality of data frames sent by all the power devices include same data, after the controlling device receives the data frames, an operating status of the system is determined according to the plurality of data frames wherein the data in the data frames are the same.

Optionally, the plurality of data frames include at least one first data frame and a plurality of second data frames. The transmission device may determine a sending sequence of the first data frame and the second data frames according to a signal value of the first data frame and signal values of the second data frames, where the signal value is used to indicate a data value of a data frame, and sequentially transmit the at least one first data frame and the plurality of second data frames to the controlling device according to the sending sequence of the first data frame and the second data frames, where the plurality of second data frames are transmitted in parallel. For example, as shown in FIG. 6, because the signal value of the first data frame is less than the signal values of the second data frames, the transmission device first transmits the at least one first data frame, and then transmits the plurality of second data frames in parallel after transmission of the first data frame is completed. After receiving the plurality of data frames, the controlling device may determine the operating statuses of the plurality of power devices according to the plurality of data frames transmitted by the transmission device. In addition, the plurality of data frames may include at least two types of data frames. As shown in FIG. 7, because the operating status of the system may be determined according to the first data frame and the second data frame (001 of the signal A, 01B of the signal B, and 1B of the signal C), the transmission device may choose to abandon transmission of the third data frame.

Further, the controlling device may obtain a data value of each fast signal in the first data frame and a data value of each fast signal in the second data frames, determine a priority of each fast signal in the first data frame and the second data frames according to the data value of each fast signal in the first data frame and the data value of each fast signal in the second data frames, select a fast signal with a high priority from the first data frame and the second data frames according to the priority of each fast signal in the first data frame and the second data frames, to form a target data frame, and determine the operating statuses of the plurality of power devices according to the target data frame. For example, as shown in FIG. 8, in the first frame, a priority of a signal A in a first data frame generated by a majority of modules is higher than a priority of a signal A in a second data frame generated by a minority of modules, and therefore, the signal A in the first data frame, a signal B in the first data frame, and a signal C in the first data frame may be selected to form a target data frame, and in the second frame, a priority of a signal A in a first data frame generated by a majority of modules is higher than a priority of a signal A in a second data frame generated by a minority of modules, and a priority of a signal B in the first data frame is lower than a priority of a signal B in the second data frame, and therefore, the signal A in the first data frame and the signal B and a signal C in the second data frame may be selected to form a target data frame. A smaller data value of a fast signal indicates a higher priority of the fast signal.

In this embodiment of the present disclosure, first, the transmission device receives the control status information sent by the controlling device, then, the transmission device transmits the control status information to the plurality of power devices, and the plurality of power devices return respective data frames to the transmission device according to the control status information after receiving the control status information, where the data frame does not include the identification information of the power device sending the data frame, and finally, the transmission device transmits the data frames including same data among the plurality of data frames to the controlling device in parallel, and the controlling device determines the operating statuses of the plurality of power devices according to the data frames after the controlling device receives the data frames. In this way, the serial bus in the transmission device is used to transmit in parallel data frames generated by a plurality of modules, thereby reducing usage of the serial bus and helping modular expansion of the system.

Figure 13:
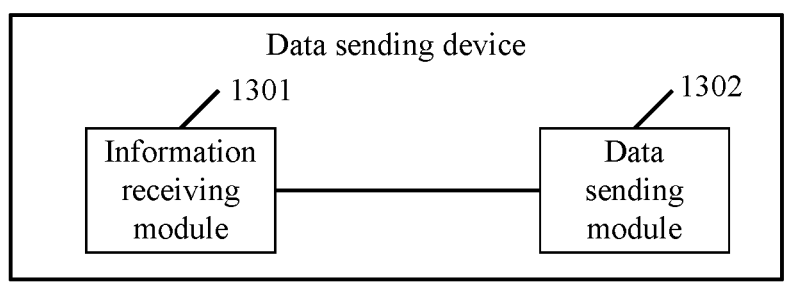
FIG. 13 is a schematic structural diagram of another data sending device for a modular UPS system according to an embodiment of the present disclosure.

Referring to FIG. 13, FIG. 13 is a schematic structural diagram of a data sending device for a modular UPS system according to an embodiment of the present disclosure. As shown in FIG. 13, the device in this embodiment of the present disclosure includes an information receiving module 1301 and a data sending module 1302.

The information receiving module 1301 is configured to receive control status information sent by a controlling device using the transmission device.

During specific implementation, the information receiving module 1301 may receive the control status information sent by the controlling device according to a preset period using the transmission device. First, the controlling device transmits the control status information to a plurality of power devices using the transmission device. Then, after receiving the control status information, the plurality of power devices generate a plurality of data frames according to the control status information.

The data sending module 1302 is configured to send a data frame to the controlling device according to the control status information, so that the transmission device transmits data frames including same data among a plurality of data frames to the controlling device in parallel, where the data frames are used by the controlling device to determine operating statuses of the plurality of power devices, and the data frames do not include identification information of power devices sending the data frames.

It should be understood that the data sending device may be the foregoing power device.

During specific implementation, the plurality of power devices may generate a plurality of data frames with same data according to the control status information, and return respective data frames to the transmission device, and the transmission device may transmit the plurality of data frames with same data to the controlling device in parallel. The data frame may be an event data frame. The event data frame includes an identifier field and a data field. The identifier field in the event data frame includes a plurality of event signals, and each event signal includes one bit of data. For example, as shown in FIG. 5, a signal A includes one bit of data, a signal B includes one bit of data, and a signal C includes one bit of data. After the plurality of power devices receive the control status information, if a signal A of a power device changes, signals A of all the power devices change and are triggered to eventually obtain data frames with same data. The event data frame requires that the controlling device respond quickly, usually within 2 ms.

Optionally, the plurality of power devices may generate at least two types of data frames according to the control status information, and send the at least two types of data frames to the transmission device at a target time point in the preset period, where the at least two types of data frames may include at least one first data frame and a plurality of second data frames. For example, as shown in FIG. 10, after receiving the control status information, the plurality of power devices send the data frames not immediately, but send the at least two types of data frames to the transmission device with a delay of a half of the preset period from a start time point of the preset period. After receiving the data frames, the transmission device may determine a sending sequence of the first data frame and the second data frames according to a signal value of the first data frame and signal values of the second data frames, where the signal value is used to indicate a data value of a data frame, and sequentially transmit the at least one first data frame and the plurality of second data frames to the controlling device according to the sending sequence of the first data frame and the second data frames, where the plurality of second data frames are transmitted in parallel. The data frame may be a fast data frame. The fast data frame includes an identifier field and a data field. The identifier field in the fast data frame includes a plurality of fast signals, and each fast signal in the fast data frame includes at least one bit of data. For example, as shown in FIG. 6 and FIG. 7, a signal A includes three bits of data, a signal B includes two bits of data, and a signal C includes one bit of data. In FIG. 6, the signal A changes from original 010B to 001B, and the signal B changes from original 01B to 10B. Signals A and signals B of a majority of power devices are triggered to obtain a first data frame, while signals A and signals B of a minority of power modules are not triggered for change, so that a second data frame is obtained. As shown in FIG. 7, the signal A changes from original 010 to 001B, the signal B changes from original 10B to 01B, and three types of data frames are eventually obtained by triggering. A signal A of a first-type power module is triggered to obtain a first data frame, a signal B of a second-type power module is triggered to obtain a second data frame, and a signal of a third-type power module is not triggered for change, so that a third data frame is obtained. Each type of fast data frame has a priority, and the priority may be determined according to a signal value. A smaller signal value indicates a higher priority, and a signal value may be a data value of a data frame. As shown in FIG. 6, because a value of the signal A in the first data frame is less than a value of the signal A in the second data frame, a priority of the first data frame is higher than that of the second data frame.

In addition, the plurality of power devices may generate, according to the control status information, some other data frames that do not require urgent transmission. This type of data frame does not require a high speed of transmission, and generally, transmission in 20 ms or 30 ms is acceptable. Therefore, this type of data frame does not need to be transmitted in parallel, and this type of data frame is not considered in this embodiment of the present disclosure.

Further, the controlling device may obtain a data value of each fast signal in the first data frame and a data value of each fast signal in the second data frames, determine a priority of each fast signal in the first data frame and the second data frames according to the data value of each fast signal in the first data frame and the data value of each fast signal in the second data frames, select a fast signal with a high priority from the first data frame and the second data frames according to the priority of each fast signal in the first data frame and the second data frames, to form a target data frame, and determine the operating statuses of the plurality of power devices according to the target data frame. For example, as shown in FIG. 8, in the first frame, a priority of a signal A in a first data frame generated by a majority of modules is higher than a priority of a signal A in a second data frame generated by a minority of modules, and therefore, the signal A in the first data frame, a signal B in the first data frame, and a signal C in the first data frame may be selected to form a target data frame, and in the second frame, a priority of a signal A in a first data frame generated by a majority of modules is higher than a priority of a signal A in a second data frame generated by a minority of modules, and a priority of a signal B in the first data frame is lower than a priority of a signal B in the second data frame, and therefore, the signal A in the first data frame and the signal B and a signal C in the second data frame may be selected to form a target data frame. A smaller data value of a fast signal indicates a higher priority of the fast signal.

In this embodiment of the present disclosure, first, the plurality of power devices receive the control status information sent by the controlling device using the transmission device, then, the plurality of power devices send respective data frames to the controlling device according to the control status information, and after receiving the plurality of data frames, the transmission device transmits the data frames including same data among the plurality of data frames to the controlling device in parallel, and finally, the controlling device determines the operating statuses of the plurality of power devices according to the plurality of data frames, where the data frame does not include the identification information of the power device sending the data frame. When the power devices generate the data frames according to the control status information, the power devices remove identification information of the power devices in original data frames, so that the plurality of power devices generate data frames wherein the data in the data frames are the same. In this way, a serial bus in the transmission device is used to transmit the data frames with same data in parallel, thereby reducing usage of the serial bus and helping modular expansion of the system.

Figure 14:
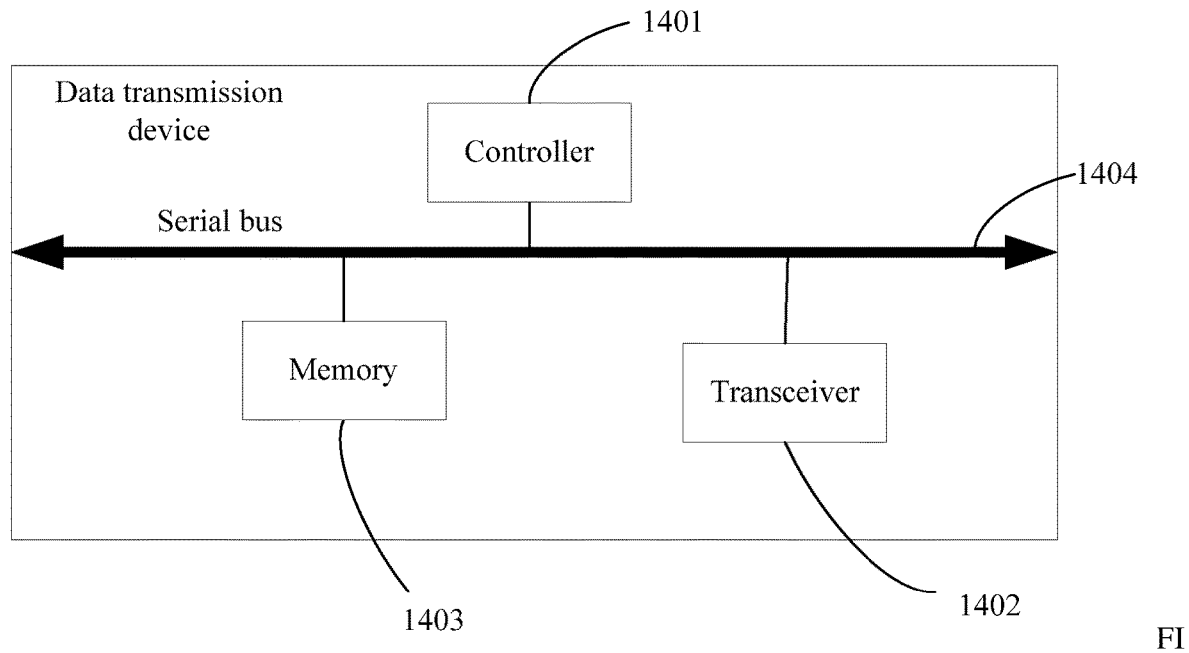
FIG. 14 is a schematic structural diagram of another data transmission device for a modular UPS system according to an embodiment of the present disclosure.

Further, referring to FIG. 14, FIG. 14 is a schematic structural diagram of still another data transmission device for a modular UPS system according to an embodiment of the present disclosure. As shown in FIG. 14, the device includes a controller 1401, a transceiver 1402, and a serial bus 1404. FIG. 14 further shows a memory 1403. The memory 1403 stores a set of program code. The controller 1401 is configured to invoke the program code stored in the memory 1403, and configured to control the serial bus 1404 to perform the following operations, receiving control status information sent by a controlling device, transmitting the control status information to a plurality of power devices, so that the plurality of power devices return respective data frames to the transmission device according to the control status information, where the data frame does not include identification information of a power device sending the data frame, and transmitting data frames including same data among the plurality of data frames to the controlling device in parallel, where the data frames are used by the controlling device to determine operating statuses of the plurality of power devices.

The controller 1401 further controls the serial bus 1404 to perform the following operation, transmitting the plurality of data frames with same data to the controlling device in parallel.

The controller 1401 further controls the serial bus 1404 to perform the following operations, determining a sending sequence of at least one first data frame and a plurality of second data frames according to a signal value of the first data frame and signal values of the second data frames, where the signal value is used to indicate a data value of a data frame, and sequentially transmitting the at least one first data frame and the plurality of second data frames to the controlling device according to the sending sequence of the first data frame and the second data frames, where the plurality of second data frames are transmitted in parallel.

It should be noted that the controller 1401 herein may be one processing element or may be an umbrella term of a plurality of processing elements. For example, the processing element may be a Central Processing Unit (CPU), or may be an Application-Specific Integrated Circuit (ASIC), or is configured to implement one or more integrated circuits such as one or more microcontrollers or one or more Field Programmable Gate Array (FPGA) in this embodiment of the present disclosure.

The memory 1403 may be one storage device, or may be an umbrella term of a plurality of storage elements, and is configured to store executable program code, or a parameter, data, or the like required for running of an application running device. The memory 1403 may include a random access memory (RAM), or may include a non-volatile memory such as a magnetic disk storage or a flash memory.

The serial bus 1404 may be an Industry Standard Architecture (ISA) bus, a Peripheral Component Interconnect (PCI) bus, an Extended Industry Standard Architecture (EISA) bus, or the like. The bus 1404 may be classified into an address bus, a data bus, a control bus, and the like. For ease of denotation, the bus is represented by only one bold line in FIG. 14, however, it does not indicate that there is only one bus or one type of bus.

The device may further include an input/output device, connected to the serial bus 1404, so as to connect to another part such as the controller 1401 using the bus. The input/output device may provide an input interface for operating personnel, so that the operating personnel select a controlled item using the input interface. The input/output device may further be another interface, and the interface may be used to connect another device externally.

Figure 15:
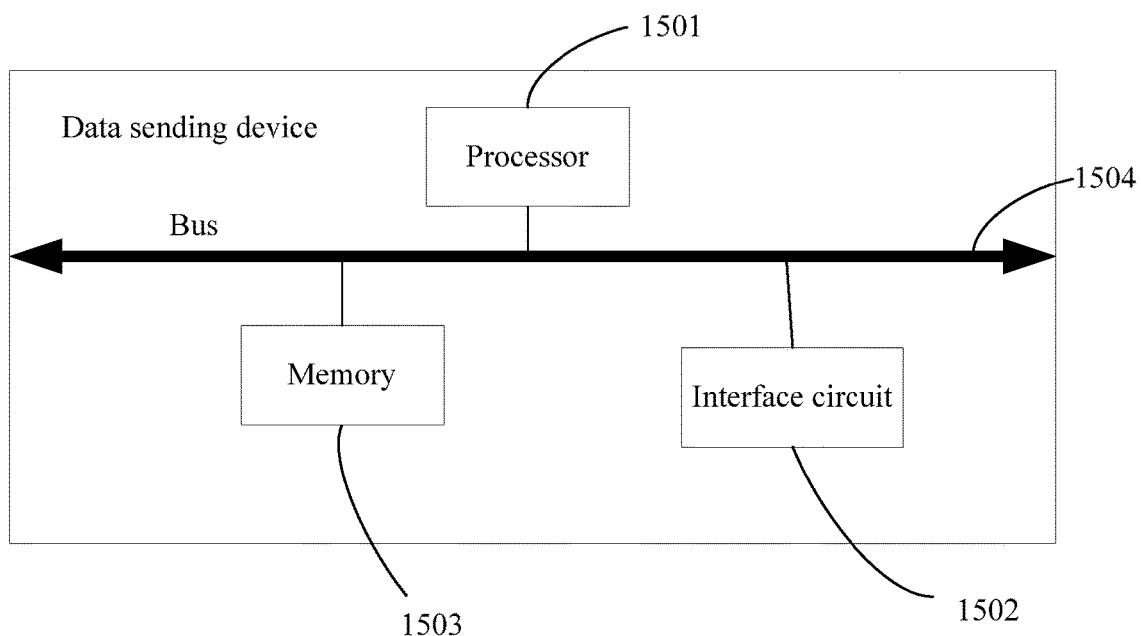
FIG. 15 is a schematic structural diagram of another data sending device for a modular UPS system according to an embodiment of the present disclosure.

Further, referring to FIG. 15, FIG. 15 is a schematic structural diagram of still another data sending device for a modular UPS system according to an embodiment of the present disclosure. As shown in FIG. 15, the apparatus includes a processor 1501 and an interface circuit 1502. FIG. 15 further shows a memory 1503 and a bus 1504. The processor 1501, the interface circuit 1502, and the memory 1503 are connected using the bus 1504, to complete communication with each other. It should be noted that the data sending device may be the foregoing power device.

The processor 1501 is configured to perform the following operation steps, receiving control status information sent by a controlling device using a transmission device, and sending a data frame to the controlling device according to the control status information, so that the transmission device transmits, to the controlling device in parallel, data frames including same data among a plurality of data frames received from a plurality of power devices in the modular UPS system, where the data frames are used by the controlling device to determine operating statuses of the plurality of power devices, and the data frames do not include identification information of power devices sending the data frames.

The processor 1501 is configured to perform the following operation step, receiving the control status information sent by the controlling device according to a preset period using the transmission device.

It should be noted that the processor 1501 herein may be one processing element, or may be an umbrella term of a plurality of processing elements. For example, the processing element may be a CPU, or may be an ASIC, or is configured to implement one or more integrated circuits such as one or more microprocessors, such as digital signal processor (DSP), or one or more FPGA in this embodiment of the present disclosure.

The memory 1503 may be one storage apparatus, or may be an umbrella term of a plurality of storage elements, and is configured to store executable program code or a parameter, data, or the like required for running by an application running apparatus. The memory 1503 may include a RAM, or may include a non-volatile memory such as a magnetic disk storage or a flash memory.

The bus 1504 may be an ISA bus, a PCI bus, an EISA bus, or the like. The bus 1504 may be classified into an address bus, a data bus, a control bus, and the like. For ease of denotation, the bus is represented by only one bold line in FIG. 15, however, it does not indicate that there is only one bus or one type of bus.

The apparatus may further include an input and output apparatus, connected to the bus 1504, so that the input and output apparatus is connected to another part such as the processor 1501 using the bus. The input and output apparatus may provide an input interface for operating personnel, so that the operating personnel select a controlled item using the input interface. The input and output apparatus may further be another interface, and the interface may be used to connect another device externally.

Referring to FIG. 16, FIG. 16 is a schematic flowchart of still another data transmission method for a modular UPS system according to an embodiment of the present disclosure. As shown in FIG. 16, the method in this embodiment of the present disclosure includes the following steps.

S1601. A power device receives control status information transmitted by a controlling device.

As shown in FIG. 1, each module in the modular UPS system is a device having a hardware entity. The modular UPS system includes a transmission device, a serial bus, a plurality of power devices, and a controlling device. Communication connections between the controlling device and the plurality of power devices are established using the transmission device. The transmission device in the system transmits real-time data of all the power devices to the controlling device, or transmits the real-time data to the controlling device in burst mode when a failure or an exception occurs. After receiving the real-time data of all the power devices, the controlling device determines operating statuses of the power modules according to the real-time data. The transmission device includes a serial bus, a controller, a transceiver, and the like, integrates functions of a physical layer and a data link layer of a network protocol, and may complete framing processing of communication data, including services such as bit stuffing, data block encoding, cyclic redundancy check, and priority determining. The plurality of power devices operate in a same manner. Each power device transmits current data of the power device to the controlling device using the serial bus, and each power device may be used as a part of an entire power output system. In addition, the controlling device may send the control status information according to a preset period using the serial bus, so as to periodically obtain data frames of the plurality of power devices and further determine the operating statuses of the plurality of power devices.

In addition, the control status information includes two types of command frames. A first-type command frame is sent according to a period T0, and a second-type command frame is sent according to a period T1. The period of the first-type command frame is longer than that of the second-type command frame, and a priority of the first-type command frame is higher than a priority of the second-type command frame.

S1602. The power device transmits a status signal data frame to a serial bus according to the control status information when determining that a current period is a first preset period, where the status signal data frame includes an identifier field, the identifier field includes a status signal data area, and the status signal data area is used to store a data value of a status signal. The status signal data frame further includes a control signal address area, and the control signal address area is used to store invalid data. The status signal data frame is a fast frame.

During specific implementation, the status signal data frame includes a triggering status signal data frame and a changing status signal data frame. A triggering status signal reflects that the power device identifies an operating status of the system. A signal value usually does not change. If a signal value of a power device changes, almost all the power devices may change simultaneously. Any change of a power device is considered as a system behavior. The controlling device responds to the behavior, and a response needs to be fast made, usually within 2 ms. A changing status signal reflects that the power device identifies an operating status of the power device. The signal changes fast, each change of the signal may generate a system behavior, and a signal value has a priority. However, a behavior or an operating status of the system is determined according to a signal value having a higher priority. For example, a value of a signal A sent by a module 1 has a higher priority, a value of the signal A with respect to the system is determined according to the value sent by the module 1. The controlling device also needs to respond to the changing status signal within 2 ms.

As shown in FIG. 17, for a triggering status signal, a data frame is assembled according to a period T1. A value in a frame type area is 1, indicating that the data frame is a triggering status signal data frame. A status signal data area is used to store a data value of the triggering status signal. When a triggering status signal is explicit, a corresponding data bit is set to 0. When a triggering status signal is implicit, a corresponding data bit is set to 1. A control signal address area is all set to 1, and a data field is a reserved bit and all set to 1. The triggering status signal data frame does not include address information of the power module, and a priority is directly determined according to the data value of the triggering status signal. A smaller data value of the triggering status signal in the data frame indicates a higher priority. After assembling the triggering status signal data frame is completed, the power device may send the triggering status signal data frame immediately.

As shown in FIG. 18, for a changing status signal, a data frame is assembled according to a period T1. A value in a frame type area is 2, indicating that the data frame is a changing status signal data frame. A status signal data area is used to store a data value of the changing status signal. When a changing status signal is explicit, a corresponding data bit is set to 0. When a changing status signal is implicit, a corresponding data bit is set to 1. A control signal address area is all set to 1, and a data field is a reserved bit and all set to 1. The changing status signal data frame does not include address information of the power module, and a priority is directly determined according to the data value of the changing status signal. A smaller data value of the changing status signal in the data frame indicates a higher priority. After assembling the changing status signal data frame is completed, the power device may send the changing status signal data frame with a delay of a half of the period T1.

S1603. The serial bus receives status signal data frames transmitted by at least two power devices, and transmits status signal data frames with a same value in the status signal data areas to the controlling device in parallel, where the serial bus is a CAN bus.

Optionally, when a data value in a status signal data area of a first status signal data frame is inconsistent with a data value in the status signal data area of a second status signal data frame, the serial bus determines transmission priorities of the first status signal data frame and the second status signal data frame according to the data value in the status signal data area of the first status signal data frame and the data value in the status signal data area of the second status signal data frame, where the first status signal data frame and the second status signal data frame are status signal data frames from different power devices, and sequentially transmits the first status signal data frame and the second status signal data frame to the controlling device according to the transmission priorities of the first status signal data frame and the second status signal data frame.

In this embodiment of the present disclosure, after receiving the first-type command frame or the second-type command frame, the power device starts to assemble the status signal data frame, and then sends the status signal data frame to the CAN bus. If the plurality of power devices simultaneously transmit status signal data frames to the CAN bus, the CAN bus arbitrates between a plurality of status signal data frames, first transmits a plurality of triggering status signal data frames with a higher priority, and then transmits a plurality of triggering status signal data frames with a lower priority. The status signal data frame does not include address information of the power device, and status signal data frames having same content or a same priority are transmitted on the CAN bus in parallel. In this way, the serial bus in a transmission device is used to transmit in parallel data frames generated by a plurality of modules, thereby reducing usage of the serial bus and helping modular expansion of the system.

Optionally, that the CAN bus sends the status signal data frames with a same value in the status signal data areas in parallel includes sending the status signal data frames with a same value in the status signal data areas only once.

For example, the current modular UPS system has 100 power devices. In a first preset period, 90 power devices send status signal data frames with a value of 1 in status signal data areas. In this case, the CAN bus sends only one status signal data frame with a value of 1 in a status signal data area to the controlling device, thereby achieving parallel transmission of the status signal data frames of the 90 power devices.

With reference to the foregoing descriptions, further, referring to FIG. 19, FIG. 19 is a schematic flowchart of a data transmission method for a modular UPS system according to another embodiment of the present disclosure. As shown in FIG. 19, the method in this embodiment of the present disclosure includes the following steps.

S1901. A power device transmits a control signal data frame to a serial bus according to a control status information when determining that a current period is a second preset period, where the control data frame includes an identifier field, the identifier field includes a control signal address area, and the control signal address area is used to store an address value of the control signal. The control signal data frame further includes a status signal data area, the status signal data area is used to store invalid data, and the control signal data frame is a slow frame.

During specific implementation, a control signal reflects that the power device identifies running data of the power device. A controlling device does not need to respond to the control signal at a high speed, and a response time may be approximately 20 ms to 30 ms.

As shown in FIG. 20, for a control signal, a data frame is assembled according to a period T0. A value in a frame type area is 3, indicating that the data frame is a control signal data frame. A status signal data area is all set to 1. A control signal address area is used to store address information of the power device. A data field is used to store a data value of a control signal. The control signal data frame includes the address information of the power module. A priority depends on the address information of the power device. A smaller address of a power device in the data frame indicates a higher priority.

S1902. The serial bus determines transmission priorities of a first control signal data frame and a second control signal data frame according to an address value in a control signal address area of the first control signal data frame and an address value in a control signal address area of the second control signal data frame, where the first control signal data frame and the second control signal data frame are control signal data frames from different power devices.

S1903. The serial bus sequentially transmits the first control signal data frame and the second control signal data frame to a controlling device according to the transmission priorities of the first control signal data frame and the second control signal data frame.

In this embodiment of the present disclosure, after receiving a first-type command frame, the power device starts to assemble the control signal data frame, and then detects a status of a CAN bus. If the CAN bus is in an idle state, the power device transmits the control signal data frame to the CAN bus. If a plurality of power devices simultaneously transmit control signal data frames to the CAN bus, the CAN bus arbitrates between a plurality of control signal data frames, and gives a highest priority to a data frame with a smallest address value, stored in a control signal address area, of a power device. Because addresses of the power devices are not duplicate, the control signal data frames are transmitted on the CAN bus frame by a frame in series. In this way, the serial bus in a transmission device is used to transmit a status signal and a control signal in a time-division manner, and a status signal data frame is a fast frame, thereby reducing a transmission delay of the status signal, and facilitating expansion of the modular UPS system.

Referring to FIG. 21, FIG. 21 is a schematic structural diagram of a power device according to an embodiment of the present disclosure. As shown in FIG. 21, the power device includes a receiver 2101 and a transmitter 2102. The receiver 2101 and the transmitter 2102 perform the methods and functions of the power device in the foregoing embodiments. Details are not described again in this embodiment of the present disclosure.

Figure 22:
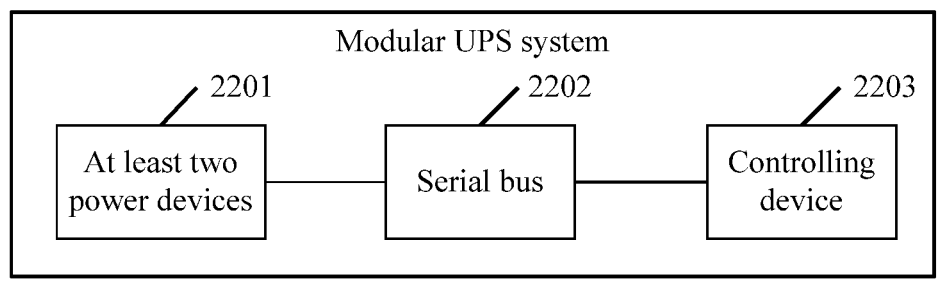
FIG. 22 is a schematic structural diagram of a modular UPS system according to an embodiment of the present disclosure.

Referring to FIG. 22, FIG. 22 is a schematic structural diagram of a modular UPS system according to an embodiment of the present disclosure. As shown in FIG. 22, the modular UPS system includes at least two power devices 2201, a serial bus 2202, and a controlling device 2203. The at least two power devices 2201, the serial bus 2202, and the controlling device 2203 perform the methods and functions of the corresponding function modules in the foregoing embodiments. Details are not described again in this embodiment of the present disclosure.

It should be noted that, for brief description, the foregoing method embodiments are represented as a series of actions. However, a person skilled in the art should appreciate that the present disclosure is not limited to the described order of the actions, because according to the present disclosure, some steps may be performed in other orders or simultaneously. In addition, a person skilled in the art should also appreciate that all the embodiments described in the specification are examples of embodiments, and the related actions and modules are not necessarily mandatory to the present disclosure.

In the foregoing embodiments, the description of each embodiment has respective focuses. For a part that is not described in detail in an embodiment, reference may be made to related descriptions in other embodiments.

Persons of ordinary skill in the art may understand that all or some of the steps of the methods in the embodiments may be implemented by a program instructing relevant hardware. The program may be stored in a computer readable storage medium. The storage medium may include a flash memory, a Read-Only Memory (ROM), a Random Access Memory (RAM), a magnetic disk, and an optical disc.

The content downloading method, the related device, and the system provided in the embodiments of the present disclosure are described in detail above. The principle and implementation of the present disclosure are described herein through specific examples. The description about the embodiments of the present disclosure is merely provided to help understand the method and core ideas of the present disclosure. In addition, persons of ordinary skill in the art can make variations and modifications to the present disclosure in terms of the specific implementations and application scopes according to the ideas of the present disclosure. Therefore, the content of specification shall not be construed as a limit to the present disclosure.

What is claimed is:

1. A modular Uninterruptible Power Supply (UPS) system, comprising:
a controlling device;
a power device coupled to the controlling device and configured to:
receive control status information from the controlling device; and
transmit a status signal data frame to a serial bus according to the control status information in response to determining that a current period is a first preset period, wherein the status signal data frame comprises an identifier field, wherein the identifier field comprises a status signal data area used to store a data value of a status signal, and wherein the status signal data frame excludes identification information of the power device; and
the serial bus configured to:
receive status signal data frames from at least two power devices; and
transmit status signal data frames with a same value in status signal data areas to the controlling device in parallel.

2. The system according to claim 1, wherein the status signal data frame further comprises a control signal address area used to store invalid data.

3. The system according to claim 1, wherein, in response to the data value in the status signal data area of the first status signal data frame being inconsistent with the data value in the status signal data area of the second status signal data frame, the serial bus is further configured to:
determine transmission priorities of a first status signal data frame and a second status signal data frame according to a data value in a status signal data area of the first status signal data frame and a data value in a status signal data area of the second status signal data frame, wherein the first status signal data frame and the second status signal data frame are status signal data frames received from different power devices; and
sequentially transmit the first status signal data frame and the second status signal data frame to the controlling device according to the transmission priorities of the first status signal data frame and the second status signal data frame.

4. The system according to claim 1, wherein the power device is further configured to transmit a control signal data frame to the serial bus according to the control status information in response to determining that the current period is a second preset period, wherein the control signal data frame comprises an identifier field, wherein the identifier field comprises a control signal address area used to store an address value of the control signal data frame, and wherein the serial bus is configured to:
determine transmission priorities of a first control signal data frame and a second control signal data frame according to an address value in a control signal address area of the first control signal data frame and an address value in a control signal address area of the second control signal data frame, wherein the first control signal data frame and the second control signal data frame are control signal data frames received from different power devices; and
sequentially transmit the first control signal data frame and the second control signal data frame to the controlling device according to the transmission priorities of the first control signal data frame and the second control signal data frame.

5. The system according to claim 4, wherein the control signal data frame further comprises a status signal data area used to store invalid data.

6. The system according to claim 1, wherein the serial bus is a Control Area Network (CAN) bus.

7. A power device, comprising:
a transceiver;
a processor coupled to the transceiver; and
a memory coupled to the processor and configured to store a plurality of instructions that, when executed, causes the processor to be configured to:
receive control status information from a controlling device; and
transmit a status signal data frame to a serial bus according to the control status information in response to determining that a current period is a first preset period to cause the serial bus to transmit received status signal data frames with a same value in status signal data areas to the controlling device in parallel, wherein the status signal data frame comprises an identifier field, wherein the identifier field comprises a status signal data area used to store a data value of a status signal, and wherein the status signal data frame excludes identification information of the power device.

8. The power device according to claim 7, wherein the status signal data frame further comprises a control signal address area used to store invalid data.

9. The power device according to claim 7, wherein the instructions further cause the processor to be configured to:
transmit a control signal data frame to the serial bus according to the control status information in response to determining that the current period is a second preset period to cause the serial bus to determine transmission priorities of a first control signal data frame and a second control signal data frame according to an address value in a control signal address area of the first control signal data frame and an address value in a control signal address area of the second control signal data frame; and
sequentially transmit the first control signal data frame and the second control signal data frame to the controlling device according to the transmission priorities of the first control signal data frame and the second control signal data frame, wherein the first control signal data frame and the second control signal data frame are control signal data frames received from different power devices, wherein the control signal data frame comprises an identifier field, and wherein the identifier field comprises a control signal address area used to store an address value of the control signal data frame.

10. The power device according to claim 9, wherein the control signal data frame further comprises a status signal data area used to store invalid data.

11. A data transmission method implemented by a power device, comprising:
receiving control status information from a controlling device; and
transmitting a status signal data frame to a serial bus according to a control status information in response to determining that a current period is a first preset period to cause the serial bus to transmit received status signal data frames with a same value in status signal data areas to the controlling device in parallel, wherein the status signal data frame comprises an identifier field, wherein the identifier field comprises a status signal data area used to store a data value of a status signal, and wherein the status signal data frame excludes identification information of the power device.

12. The method according to claim 11, wherein the status signal data frame further comprises a control signal address area used to store invalid data.

13. The method according to claim 11, further comprising transmitting a control signal data frame to the serial bus according to the control status information in response to determining that the current period is a second preset period to cause the serial bus to determine transmission priorities of a first control signal data frame and a second control signal data frame according to an address value in a control signal address area of the first control signal data frame and an address value in a control signal address area of the second control signal data frame; and
sequentially transmitting the first control signal data frame and the second control signal data frame to the controlling device according to the transmission priorities of the first control signal data frame and the second control signal data frame, wherein the first control signal data frame and the second control signal data frame are control signal data frames received from different power devices, wherein the control signal data frame comprises an identifier field, and wherein the identifier field comprises a control signal address area used to store an address value of the control signal data frame.

14. The method according to claim 13, wherein the control signal data frame further comprises a status signal data area used to store invalid data.

15. A computer program product comprising computer-executable instructions for storage on a non-transitory computer-readable medium that, when executed, cause a power device to
receive control status information from a controlling device; and
transmit a status signal data frame to a serial bus according to a control status information in response to determining that a current period is a first preset period to cause the serial bus to transmit received status signal data frames with a same value in status signal data areas to the controlling device in parallel, wherein the status signal data frame comprises an identifier field, wherein the identifier field comprises a status signal data area used to store a data value of a status signal, and wherein the status signal data frame excludes identification information of the power device.

16. The medium according to claim 15, wherein the status signal data frame further comprises a control signal address area used to store invalid data.

17. The medium according to claim 15, wherein the computer-executable instructions further cause the power device to:
transmit a control signal data frame to the serial bus according to the control status information in response to determining that the current period is a second preset period to cause the serial bus to determine transmission priorities of a first control signal data frame and a second control signal data frame according to an address value in a control signal address area of the first control signal data frame and an address value in a control signal address area of the second control signal data frame; and
sequentially transmit the first control signal data frame and the second control signal data frame to the controlling device according to the transmission priorities of the first control signal data frame and the second control signal data frame, wherein the first control signal data frame and the second control signal data frame are control signal data frames received from different power devices, wherein the control signal data frame comprises an identifier field, and wherein the identifier field comprises a control signal address area used to store an address value of the control signal data frame.

18. The medium according to claim 17, wherein the control signal data frame further comprises a status signal data area used to store invalid data.

19. The medium according to claim 17, wherein the computer-executable instructions further cause the power device to transmit a control signal data frame to the serial bus according to the control status information in response to determining that the current period is a second preset period.

20. The medium according to claim 17, wherein the computer-executable instructions further cause the power device to generate a plurality of data frames with same data according to the control status information.

* * * * *